United States Patent
Verhoeven et al.

(10) Patent No.: US 10,621,855 B2
(45) Date of Patent: Apr. 14, 2020

(54) ONLINE OCCUPANCY STATE ESTIMATION

(71) Applicant: Google Inc., Mountain View, CA (US)

(72) Inventors: Pieter Verhoeven, San Francisco, CA (US); Prashant Reddy, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 243 days.

(21) Appl. No.: 15/707,027

(22) Filed: Sep. 18, 2017

(65) Prior Publication Data

US 2019/0087696 A1    Mar. 21, 2019

(51) Int. Cl.
*G08B 29/18* (2006.01)

(52) U.S. Cl.
CPC .......... *G08B 29/185* (2013.01); *G08B 29/18* (2013.01); *G08B 29/183* (2013.01)

(58) Field of Classification Search
CPC .... G08B 29/18; G08B 29/183; G08B 29/185; G08B 29/188; G01C 21/16; G01C 21/165; G05B 2219/2642; G06F 9/44; G06F 15/00; G06F 17/18; G06F 4112/26; G06T 15/005; G06T 15/05; G06T 19/00; G06T 19/003; H04L 12/26; H04L 87/00; H04L 87/22; H04L 87/24
See application file for complete search history.

(56) References Cited

U.S. PATENT DOCUMENTS

| | | | |
|---|---|---|---|
| 7,884,727 B2 | 2/2011 | Tran | |
| 8,510,255 B2 | 8/2013 | Fadell et al. | |
| 9,129,524 B2 | 9/2015 | Delibaltov et al. | |
| 2011/0213588 A1 | 9/2011 | Lin et al. | |
| 2013/0024029 A1 | 1/2013 | Tran et al. | |
| 2017/0343356 A1* | 11/2017 | Roumeliotis | G01C 21/32 |
| 2018/0365975 A1* | 12/2018 | Xu | G01S 13/04 |
| 2019/0045331 A1* | 2/2019 | Liang | H04W 4/185 |

* cited by examiner

*Primary Examiner* — Van T Trieu
(74) *Attorney, Agent, or Firm* — Morris & Kamlay LLP

(57) ABSTRACT

Systems and techniques are provided for online occupancy state estimation. Signals may be received from sensors distributed in an environment. The signals may include reports from the sensors. Occupancy state estimates may be generated for a ground-truth estimate sequence for the environment. Each occupancy state estimate may correspond to an interval of a time period. An online occupancy model may be generated. based at least partially on the ground-truth estimate sequence for the environment. A current occupancy state estimate may be generated for the environment using the online occupancy model and sensor states of the sensors. The sensor states may be based on the reports from the sensors.

20 Claims, 12 Drawing Sheets

ONLINE OCCUPANCY STATE ESTIMATION

BACKGROUND

Sensors in an environment may be used to infer information about occupants of the environment in real-time. The data provided by sensors in an environment may include a limited number of noisy observations. The sensors may have limited fields of view, and may only be able to provide data about the environment with low granularity. This may make interpretation of the data from the sensors in real-time difficult and result in incorrect inferences about the occupants of the environment. It may be difficult to generate a model that can be used to interpret data from sensors in varying environments that will provide accurate inferences about the occupants of those environments in real-time, as sensor data may need to be interpreted differently for different environments.

BRIEF SUMMARY

According to an embodiment of the disclosed subject matter, signals may be received from sensors distributed in an environment. The signals may include reports from the sensors. Occupancy state estimates may be generated for a ground-truth estimate sequence for the environment. Each occupancy state estimate may correspond to an interval of a time period. An online occupancy model may be generated based at least partially on the ground-truth estimate sequence for the environment. A current occupancy state estimate may be generated for the environment using the online occupancy model and sensor states of the sensors. The sensor states may be based on the reports from the sensors.

The occupancy state estimates for a ground-truth estimate sequence may be generated based on heuristics. The occupancy state estimates for a ground-truth estimate sequence may be generated based on a lumped sensor. A lumped sensor may include a combination of states of sensors of the same type over the time period.

The online occupancy model may include a transition model and a sensor model. The transition model may include a transition probability matrix for possible occupancy states of the environment generated based on the occupancy state estimates for the ground-truth estimate sequence. The sensor model may include lumped sensor probability distributions based on an event log including the reports from the sensors and the occupancy state estimates for the ground-truth estimate sequence.

The lumped sensor probability distributions may include a lumped activity sensor probability distribution based on reports from activity sensors and a lumped presence sensor probability distribution based on reports from presence sensors. Generating a current occupancy state estimate for the environment using the online occupancy model and sensor states of the sensors may use the transition model and the sensor model alternatively.

A security system or a thermostat of the environment may be adjusted based on the currency occupancy state estimate for the environment.

According to an embodiment of the disclosed subject matter, a means for receiving signals from sensors distributed in an environment, the signals including reports from the sensors, a means for generating occupancy state estimates for a ground-truth estimate sequence for the environment, each occupancy state estimate corresponding to an interval of a time period, a means for generating an online occupancy model based at least partially on the ground-truth estimate sequence for the environment, a means for generating a current occupancy state estimate for the environment using the online occupancy model and sensor states of the sensors, wherein the sensor states are based on the reports from the sensors, and a means for adjusting security system or a thermostat of the environment based on the currency occupancy state estimate for the environment, are included.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
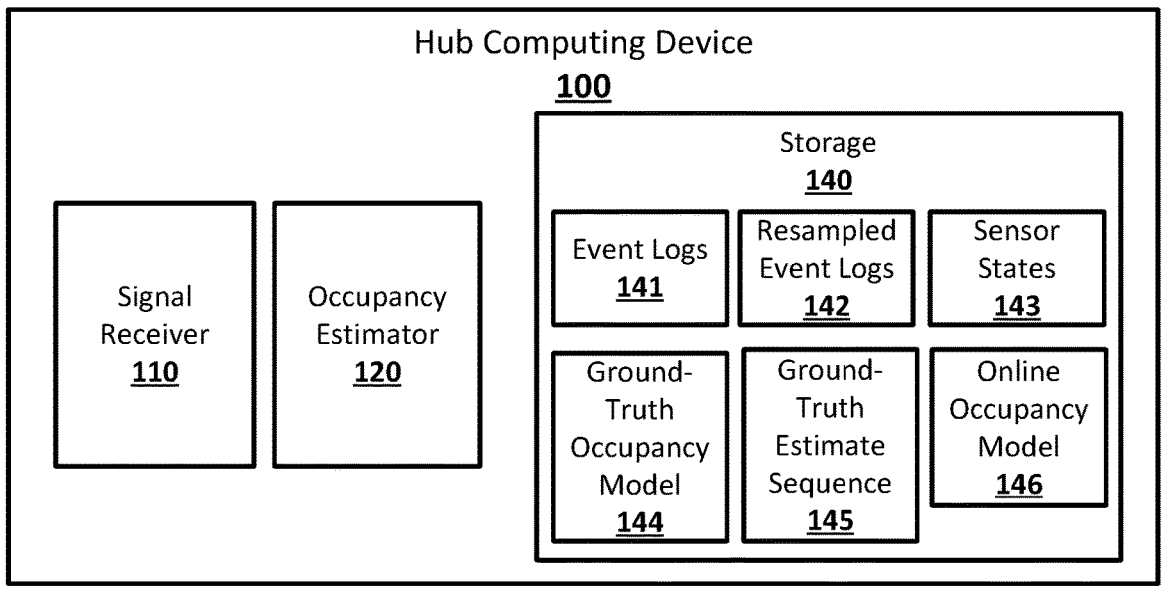
FIG. 1 shows an example system suitable for online occupancy state estimation according to an implementation of the disclosed subject matter.

According to embodiments disclosed herein, online occupancy state estimation may allow for the online estimation of the current occupancy state of an environment based on sensor data, and for a retrospective estimation of the occupancy state of the environment based on the sensor data that may be used to increase the accuracy of the online estimation. The environment may be, for example, a home, office, apartment, condo, or other structure, and may include a combination of enclosed and open spaces. The environment may be a smart environment, such as, for example, a smart home environment or a smart office environment. Signals may be received from sensors in the smart environment. The sensors may monitor the environment for indications that persons are present or absent from the environment. The sensors may be, for example, low power motion sensors, such as a passive infrared sensor used for motion detection, light sensors, cameras, microphones, entryway sensors, smart light switches, mobile device scanners for detecting the presence of mobile computing devices or fobs via WiFi, Bluetooth, and RFID, and the like.

The signals from the sensors in the environment may be used by an online occupancy model to generate a current online occupancy state estimate for the environment, which may be an occupancy state estimate of the environment as of the time the estimate is generated. The online occupancy state estimate may include any suitable level of granularity, such as, for example, an overall state of the environment, including whether the environment is vacant, has occupants who are active, or has occupants who are asleep, at the time the online occupancy state estimate is made, or a state of various individuals within a non-vacant environment, such as which people and animals are present or absent from the environment at the time the online occupancy state estimate is made, where they are located within the environment, and what activities they are engaged in. The online occupancy state estimate may be stored.

The signals from the sensors in the environment may be stored, and may be used by a ground-truth occupancy model to generate a ground-truth occupancy state estimate. The ground-truth occupancy state estimate may include any suitable level of granularity, such as, for example, an overall state of the environment, including whether the environment was vacant, had occupants who were active, or had occupants who were asleep, at a particular point in the past, or a state of various individuals within a non-vacant environment, such as which people and animals were present or absent from the environment at the particular time in the past the ground truth estimate is made for, where they were located within the environment, and what activities they were engaged in. The ground-truth occupancy state estimate may be generated retrospectively, using stored sensor data from before, during, and after the point in time in the past the ground-truth occupancy state estimate is generated for. The ground-truth state estimate may be used to train the online occupancy model. Ground-truth state estimates for an environment over a period of time may form a ground-truth estimate sequence for the environment. The ground-truth estimate sequence may be used as training data for the online occupancy model in any suitable matter, for example, depending on the nature of the online occupancy model. For example, probabilities relating states of the environment to each and to states of the sensors of the environment may be extracted from the ground-truth estimate sequence and used by the online occupancy model when generating a current occupancy state estimate.

The environment may include a hub computing device, which may be any suitable computing device for managing the smart home environment, including a security system of the smart home environment and automation system including other functions beyond security. The hub computing device may be a controller for a smart home environment. For example, the hub computing device may be or include a smart thermostat. The hub computing device also may be another device within the smart home environment, or may be a separate computing device dedicated to managing the smart home environment, and may perform processing locally, or may communicate with and utilize for processing a remote computing device to the smart home environment, such as a remote server system. The hub computing device for an environment may also be located remotely, for example, as part of a remote server system. The hub computing device may be connected, through any suitable wired and wireless connections, to a number of sensors distributed throughout an environment. For example, the hub computing device, sensors, and other components of the smart home environment may be connected in a mesh network, or the sensors and other components may communicate with a remote computing device, for example, through any suitable wide-area network connection. Some of the sensors may, for example, be motions sensors, including passive infrared sensors used for motion detection, light sensors, cameras, microphones, entryway sensors, smart light switches, as well as mobile device scanners that may use Bluetooth, WiFi, RFID, or other wireless devices as sensors to detect the presence of devices such as smartphones, tablets, laptops, or fobs. Sensors may be distributed individually, or may be combined with other sensors in sensor devices. For example, a sensor device may include a low power motion sensor and a light sensor, or a microphone and a camera, or any other combination of available sensors.

Signals from the sensors distributed throughout the environment may be sent to the hub computing device, or may be sent directly to a remote computing device, for example, a remote server system. The data in the signals received from the sensors may be used to make determinations about the environment. For example, the hub computing device, or remote computing device may use data in the signals received from the sensors to determine how many occupants, including people and pets, are in a home, based on motion sensing, voice, face, and motion recognition through cameras, changing light levels reported by light sensors, turning on and off of smart light switches, and detection of computing devices, such as smartphone or tablets, or fobs associated with residents of the home or guests in the home, or pets, or any other suitable data generated by any suitable sensor.

An online occupancy model may be used by a computing device, such as the hub computing device or a remote computing device, to generate an occupancy state estimate of the environment based on data in the signals received from the sensors. The data in the signals used by the online occupancy model may be any data which may provide indications of whether or not persons or pets are in the environment. For example, data in signals from a motion detector may be used by an online occupancy model, while data in signals from a carbon monoxide detector may not be used, as they may not be useful in determining the presence or absence of any occupant from the environment. Sensors which detect motion, such as passive infrared sensors, may be activity sensors. Sensors which detect presence, for example, based on the location of a known mobile computing device such as a smartphone relative to a geo-fence or to another device, such as a thermostat or sensor, within the environment, for example, using Bluetooth low energy communications, may be presence sensors. A geo-fence monitor may be a presence sensor which may monitor the location of a particular known mobile computing device relative to a particular geo-fence. Geo-fence monitors may be implemented, for example, on the hub computing device, and may not require additional physical devices to be placed in the environment, although additional physical devices, such as, for example, beacons, may be used in conjunction with geo-fence monitors. An environment may include one geo-fence monitor running on the hub computing device for each combination of geo-fence and mobile computing device being monitored.

The data in the signals from the sensors may include, for example, any suitable values that may indicate the state of the environment as currently detected by the sensor. For example, a motion sensor, such as a passive infrared sensor, may provide a value of any suitable length that may indicate the level of motion detected by the sensor. The value may be, for example, an 8-bit value, with a low value of 0, indicating no detection of any moving heat source, and a high value of 255. A motion sensor may provide a value at regular intervals. A presence sensor, such as a geo-fence monitor, may provide a value indicating the entering or exiting of a known mobile computing device from the geo-fence when such an entering or exiting is detected.

The data in a signal that arrives from a sensor may be a report from the sensor, and may be stored by the hub computing device, or by another computing device which receives the signal, such as a remote computing device, for example, a remote server system, in event logs for each sensor. The event logs for a sensor may store a timestamp for each report received from the sensor along with the value in the report. Timestamps may be stored with any suitable degree of granularity. For example, a timestamp stored in an event log may include the year, month, day of month, and time in hours, minutes, and seconds that the report was received by the hub computing device or other computing device, or that the report was generated by the sensor.

The event logs for the sensors in an environment may be used by the ground-truth occupancy model. Before being input into the ground-truth occupancy model, the event logs may be pre-processed and resampled. The event log for a sensor may be pre-processed by mapping the values stored for the sensor to states for the sensor. For example, a value from a passive infrared sensor may be used to decide if the passive infrared sensor can be considered to have detected motion. If the value received in a report and stored in the event log is above a set threshold, the state for the passive infrared sensor at the time the report was received may be set to true, indicating that the passive infrared sensor can be considered to have detected motion based on the threshold. If the value is below the threshold, the state for the passive infrared sensor at the time the report was received may be set to false. A value from a geo-fence monitor of "entering" may result in the state for the geo-fence monitor at the time of the report with that value being set to true, while a value of "exiting" may result in the state for the geo-fence monitor being set to false. Pre-processing an event log may generate a pre-processed event log, which may be separate from the event log from which it was generated, so as not to overwrite the original event log.

After the event log for a sensor is pre-processed, the pre-processed event log may be resampled. The state of the sensor may be determined at specified intervals over the length of the pre-processed event log. The intervals may be any suitable intervals of time, and may be relative to any time. For example, intervals may be relative to an on-the-hour time. The first interval may be at the first an on-interval time that is after the earliest timestamp in the pre-processed event log. For example, the intervals may be every 5 minutes, relative to 12:00 am, and the earliest timestamp in the pre-processed event log may be Mar. 1, 2017, 12:08:12 am. The first interval after resampling may be Mar. 1, 2017, 12:10:00 am, and any additional intervals may be every 5 minutes thereafter until a last interval, which may be at an on-interval time that is later than the latest timestamp in the pre-processed event log is reached.

A state of the sensor may be determined at each interval, from the first interval to the last interval, based on interpolation of the states of the sensor and their timestamps in the pre-processed event logs. For example, a passive infrared sensor may have a state of false at Mar. 1, 2017, 12:01:14 am, false at Mar. 1, 2017, 12:06:14 am, true at Mar. 1, 2017, 12:10:45 am, true at Mar. 1, 2017, 12:15:45 am, at false Mar. 1, 2017, 12:18:27 am. At a first interval of Mar. 1, 2017, 12:05:00 am, the sensor may be inferred to have a state of false, as the pre-processed logs may show that the sensor had a state of false at Mar. 1, 2017, 12:01:14 am, and did not have a state of true before Mar. 1, 2017, 12:05:00 am. At a second interval of a Mar. 1, 2017, 12:10:00 am, the sensor may be inferred to have a state of false, at a third interval of Mar. 1, 2017, 12:15:00 am the sensor may be inferred to have a state of true, and at a fourth and last interval of Mar. 1, 2017, 12:20:00 am, the sensor may be inferred to have a state of true. Resampling a pre-processed event log may generate a resampled event log, which may be separate from the pre-processed event log from which it was generated, so as not to overwrite the pre-processed event log.

Resampled event logs for the sensors in the environment may be input to the ground-truth occupancy model. The event logs may be pre-processed, resampled, and input to the ground-truth occupancy model at any suitable interval. For example, resampled event logs may be generated and input to the ground-truth occupancy model once per hour. The resampled event logs for all of the activity sensors in an environment may be combined into a lumped resampled event log, representing all of the activity sensors in the environment as a single lumped activity sensor. At each interval, the states of all of the activity sensors may be ORed together, so that the single lumped activity sensor has a state of true at an interval in the lumped resampled event log if any of the activity sensors has a state of true at that interval in their individual resampled event log. The single lumped activity sensor may only have a state of false at an interval if all of the activity sensors have a state of false at that interval. A lumped resampled event log for the presence sensors may be similarly generated by combining the resampled event logs for the presence logs to represent a single lumped presence sensor, and lumped resampled event logs may be generated for any other sensor types based on the sensors in the environment.

The ground-truth occupancy model may apply a set of rules, for example, heuristics, to the lumped resampled event log for the activity sensors to estimate an occupancy state of the environment at the intervals in the lumped resampled event log. For example, the online ground truth occupancy model may be able to estimate three states of the environment, a vacant state, which may indicate an estimate that nobody is present in the environment, an active state, which may indicate an estimate that someone is present and active in the environment, and a sleeping state, which may indicate an estimate the someone is present and sleeping in the environment. The rules may be any suitable rules which may be based on known patterns of the occupants of an environment. For example, if the environment is a home, the rules may be based on known sleeping and waking patterns of the occupants of the environment. For example, whether the state of environment should be estimated as vacant or sleep during periods of inactivity during sleeping hours may be determined based on whether the lumped resampled event log indicates activity at interval that occurs after a late up wake up time. The occupancy state of the environment may be estimated as vacant for a period of time when the lumped resampled event log shows no activity was detected over a period of time during waking hours. The rules may be forward and backward looking, for example, estimating the occupancy state of the environment at an interval based on the detection or non-detection of activity for any suitable number of intervals before and/or after the interval. For example, an occupancy state estimate for 12:15:00 am may be based on the state of the environments sensors at 12:10:00 am, 12:15:00 am, and 12:20:00 am, if available.

The ground-truth occupancy model may also apply a set of rules, for example, heuristics, to the lumped resampled event log for the presence sensors to adjust estimations of the occupancy state of the environment made based on the lumped resampled event log for the activity sensors, or to make original estimations if the environment has no activity sensors and therefore no lumped resampled event log for the activity sensors. For example, the occupancy state of the environment at an interval may have been estimated, based on the lumped resampled event log for the activity sensors, to be vacant. The lumped resampled event log for the presence sensors may indicate that, at the interval, the presence of an occupant was detected in the environment. The occupancy state of the environment for that interval may be re-estimated to active if the interval occurs during waking hours for the environment, or to sleep if the interval occurs during sleeping hours. Similarly, an interval where presence was detected after at least one interval where no presence was detected during waking hours or sleeping hours may indicate the start of an active period, and may result in the occupancy state of the environment for that interval and a suitable number of subsequent intervals being estimated as active, regardless of the estimation of the occupancy state of the environment at those intervals that was made based on the lumped resampled event log for the activity sensors. The number of intervals estimated as active may be different when the interval where presence was detected occurs during waking or sleeping hours, for example, with fewer subsequent intervals being estimated as active during sleeping hours. The lumped resampled event log for the presence sensors may be used similarly in backwards looking manor, for example, setting prior intervals to active when a subsequent interval represents the end of the detection of the presence of occupants in the environment.

The ground-truth occupancy model may apply additional rules, for example, heuristics, to the lumped resampled event logs for the presence sensors and the activity sensors to adjust estimates of the occupancy state of the environment made based on the lumped resampled event log for the activity sensors as adjusted based on the lumped resampled event log for the presence sensors. For example, if, over a given set of intervals, the lumped resampled event log for the presence sensors indicates no presence for any of the intervals, and the lumped resampled event log for the activity sensors indicates no activity for any of the intervals, the occupancy state of the environment for all of intervals in the given set of intervals may be estimated as vacant. The ground-truth occupancy model may apply further additional rules for any other lumped resampled event logs generated for any other sensor types, and for any combination of lumped resampled event logs.

The ground-truth occupancy model may generate, through application of the rules to the lumped sensor event logs, ground-truth estimates for the occupancy state of the environment for the time period covered by the event logs for the sensors. Each interval in the time period may have its own ground-truth estimate. The ground-truth estimate for an interval may be changed whenever the ground-truth occupancy model generates occupancy state estimates. For example, if the ground-truth occupancy model generates estimates once every hour, an estimate for the occupancy state of the environment at 12:45:00 am that is made by the ground truth-occupancy model at 1:00:00 am may be changed when the ground-truth occupancy model generates estimates at 2:00:00 am. Changes to a ground-truth estimate may occur due to, for example, reports from sensors that occurred after the ground-truth estimate was made. For example, the ground-truth estimate for the occupancy state of the environment at 12:45:00 am may be updated at 2:00 am due to reports received from sensors after 1:00:00 am, which may be reflected in the lumped resampled event logs for the activity sensors or presence sensors. The ground-truth estimates for the intervals may be stored as a ground-truth estimate sequence for the environment.

In some implementations, the ground-truth occupancy model may be, for example, model for a machine learning system. The machine learning system model may be, for example, a neural network, a learning classifier, a decision-tree model, a statistical model, or any other suitable machine learning model that use supervised learning. The machine learning system model may be trained using, for example, ground-truth occupancy data and sensor data collected from various environments, such as smart homes and offices. The machine learning system model may be used as the ground-truth occupancy model to generate a ground-truth estimate sequence for an environment based on event logs from sensors of the environment.

The reports from the sensors may be used by an online occupancy model to estimate the current occupancy state of the environment. The reports may be stored by the hub computing device, or remote computing device, as they arrive from the sensors. The reports may include a value from the sensor, which may be used to determine a current state for the sensor. For example, a value from a passive infrared sensor may be used to decide if the passive infrared sensor can be considered to have detected motion. For example, if the value is above a set threshold, the current state for the passive infrared sensor may be set to true, indicating that the passive infrared sensor can be considered to have detected motion based on the threshold. If the value is below the threshold, the current state for the passive infrared sensor may be set to false. A value from a geo-fence monitor of "entering" may result in the current state for the geo-fence monitor being set to true, while a value of "exiting" may result in the current state for the geo-fence monitor being set to false.

When a report is received from a sensor, several timestamps may be updated for the sensor. For example, a current timestamp may indicate the time that the latest report was received, or that the current state was determined from the data, for example, value, in the latest report. Transition timestamps may indicate the last time the current state of the sensor transitioned from one possible state to any of the other possible states of the sensor. For example, a report from a passive infrared sensor may be used to update two transition timestamps, one indicating the last time the current state of the passive infrared sensor transitioned from true to false, and the other indicating the last time the current state of the passive infrared sensor transitioned from false to true. If the current state determined from the most recent report from a sensor is different than the previous current state of the sensor, the appropriate transition timestamp may be updated to be equal to the current timestamp. For example, if a report from a passive infrared sensor includes a value the results in the current state of the passive infrared being set to true when the immediately prior current state was false, the transition timestamp for the last time the passive infrared sensor transitioned from false to true may be updated to be equal to the current timestamp. Presence sensors, such as a geo-fence monitor, may include similar transition timestamps based on the available states for the geo-fence monitor, which may also be true and false states. Timestamps may be stored with any suitable degree of granularity. For example, a timestamp may include the year, month, day of month, and time in hours, minutes, and seconds.

Before being input into the online occupancy model, the current state and timestamps for a sensor may be converted into sensor feature data. For example, the current state and timestamps may be used to infer the state of the sensor at specified intervals over a time frame. The intervals may be any suitable intervals of time, and may be relative to any starting time. For example, the intervals may be relative to an on-the-hour time. The time frame may be any suitable length of time, and may start and end on intervals, which may result in the time frame extending past the current actual time. The starting interval for the time frame may be based on, for example, the last time the online occupancy model was used to generate an occupancy state estimate, and the last interval may be based on, for example, the current time. For example, if the previous time the occupancy model generated a current occupancy state estimate was 12:08:24 am, and the current time is 12:22:23 am, the first interval of the time frame may be at 12:15:00 am as an occupancy state estimate for 12:10:00 am may have already been generated at 12:08:24 am, a second interval may be a second interval may be at 12:20:00 am, and the last interval may be at 12:25:00 am.

A state for the sensor at each of the intervals may be determined using the current state of the sensor, the current timestamp, and the transition timestamps. For example, a passive infrared sensor has a current state of true, a current timestamp of Mar. 1, 2017, 12:22:23 am, a transition timestamp for the transition from false to true of Mar. 1, 2017, 12:16:12 am, and a transition timestamp for the transition from true to false of Mar. 1, 2017, 12:01:45 am. For intervals starting Mar. 1, 2017, 12:15:00 am, and ending Mar. 1, 2017, 12:25:00 am, the intervals may be at Mar. 1, 2017, 12:15:00 am, Mar. 1, 2017, 12:20:00 am, and Mar. 1, 2017, 12:25:00 am. The state of the sensor at the first interval of Mar. 1, 2017, 12:15:00 am may be false, as the sensor last transitioned to false Mar. 1, 2017, 12:01:45 am, before the time of the first interval, and may not have transitioned to true until Mar. 1, 2017, 12:16:12 am, after the time of the first interval. The state of the sensor at the second interval of Mar. 1, 2017, 12:20:00 am may be true, as the sensor last transitioned to true at Mar. 1, 2017, 12:16:12 am, before the time of the second interval and after the last transition to false Mar. 1, 2017, 12:01:45 am. The state of the sensor at the third interval of Mar. 1, 2017, 12:25:00 am may be true, as the sensor as the sensor last transitioned to true at Mar. 1, 2017, 12:16:12 am, before the time of the second interval and after the last transition to false Mar. 1, 2017, 12:01:45 am.

The current state and timestamps for any number of sensors in the environment may be converted to sensor feature data before being input to the online occupancy model. For example, the current state and timestamps for all of the available sensors in the environment may be converted to sensor feature data. The conversion may occur as reports are received for each sensor so that the sensor feature data for a sensor is updated as quickly as possible to reflect any changes in the state of the sensor.

The sensor feature data may be used as input to the online occupancy model. The online occupancy model may by any suitable model for estimating the occupancy state of the environment at the current time based on the sensor feature data. The online occupancy model may, for example, assume that the occupancy state dynamics may be described by a Hidden Markov Hodel (HMM), which may allow for the use of, for example, sequential Bayesian filtering. The occupancy states of the environment may be the hidden states of the HMM, and the state of the sensors may be the observable emissions of the hidden states in the HMM.

The online occupancy model may estimate the current occupancy state of the environment at any suitable time. For example, the online occupancy model may generate estimates only after a new report has been received from a sensor in the environment, or when such a report results in a change in the current state for a sensor. The online occupancy state estimate may include any suitable level of granularity, such as, for example, an overall state of the environment, including whether the environment is vacant, has occupants who are active, or has occupants who are asleep, at the time the online occupancy state estimate is made, or a state of various individuals within a non-vacant environment, such as which people and animals are present or absent from the environment at the time the online occupancy state estimate is made, where they are located within the environment, and what activities they are engaged in. When the online occupancy model generates estimates, it may generate occupancy state estimates for each interval that has occurred since the previous time the online occupancy model generated estimates. For example, if the online occupancy model generates occupancy state estimates at 12:08:12 am, including an occupancy state estimate for 12:10:00 am, and then generates occupancy state estimates at 12:22:23 am, the occupancy state estimates generated at 12:22:23 am may be for 12:15:00 am, 12:20:00 am, and 12:25:00 am. The occupancy states estimates may be generated sequentially, as an occupancy state estimate for an interval may be based on the occupancy state estimate made for the immediately previous interval. For example, the occupancy state estimate made for 12:15:00 am may be based on the occupancy state estimate that was made for 12:10:00p, and the occupancy state estimate for a 12:20:00 am may be based on the occupancy state estimate for 12:15:00 am.

The sequential Bayesian filtering of the online occupancy model may use a transition model and a sensor model. The transition model may be used in a prediction step of the sequential Bayesian filtering of the online occupancy model, and the sensor model may be used in an update step of the sequential Bayesian filtering of the online occupancy model. The online occupancy model may perform the prediction step and the update step at alternate time steps to generate each occupancy state estimate. For example, a first occupancy state estimate generated by the online occupancy model at a time k, for example 12:15:00 am, may be based on an occupancy state estimate from the transition model, and a second occupancy state estimate generated by the online occupancy model at a time k+1, for example, 12:20:00 am, may be based on an occupancy state estimate generated by the sensor model.

The transition model may be a Markov transition model for a Discrete-time Markov chain. The Markov transition model may model transitions between various states of the environment that can be estimated by the online occupancy model, for example, based on transition probabilities determined through the ground-truth occupancy state estimates made by the ground-truth occupancy model. For example, the online occupancy model may be able to estimate three states of the environment, a vacant state, which may indicate an estimate that nobody is present in the environment, an active state, which may indicate an estimate that someone is present and active in the environment, and a sleeping state, which may indicate an estimate the someone is present and sleeping in the environment. The Markov transition model may include probabilities of transition from each of the three states to both itself and the other two states, resulting in nine separate probabilities for nine transition pairs. The Markov transition model may be used to generate an occupancy state estimate for the current state of the environment according to:

$$P(x_k|z_{k-1}) = T^T P(x_{k-1}|z_{k-1}) \tag{1}$$

where $x_k$ may be a current occupancy state of the environment, $x_{k-1}$ may be an occupancy state of the environment at the immediately previous time step, $z_{k-1}$ may be a state of the sensors of the environment at the immediately previous time step, T may be a transition probability matrix that includes the probabilities of transition between the states of the environment as determined through ground-truth occupancy state estimates. $P(x_k|z_{k-1})$ may represent a prior belief state for the current occupancy state of the environment, for example, the probability that the current occupancy state of the environment is x, as determined at time k using a state of the sensors that was determined at time k−1. $P(x_{k-1}|z_{k-1})$ may represent a posterior belief state for the occupancy state of the environment at the immediately previous time step, for example, the probability that the occupancy state of the environment was x, as determined at time k−1 using a state of the sensors that was determined at time k−1. $P(x_{k-1}|z_{k-1})$ may be, for example, an occupancy state estimate generated by the sensor model at the immediately previous interval. The transition model may thus update the occupancy state estimate based on the transition probabilities between the states of the environment given the passage of time and the same sensor state, as the state of the sensors may not be updated to reflect any changes from any reports by the sensors in the environment. The occupancy state estimate generated by the transition model may be the state x at time k for which the probability $P(x_k|z_{k-1})$ is highest.

The transition probability matrix T may include the probabilities of transition between the states of the environment as determined through ground-truth occupancy state estimates. For example, the ground-truth estimate sequence may list, chronologically and sequentially, the ground-truth estimates for the occupancy state of the environment at each interval over any suitable period of time. Transitions between occupancy states in the ground-truth estimate sequence may be counted. For example, an interval at Mar. 1, 2017, 8:15:00 am may have an estimated occupancy state of active, and the subsequent interval at Mar. 1, 2017, 8:20:00 am may also have an estimated occupancy state of active. This may count as a transition from an active state to an active state. The next interval, at Mar. 1, 2017, 8:25:00 am, may have an estimated occupancy state of vacant. This may count as a transition from a vacant state to active state. Each transition of the estimated occupancy state between subsequent interval in the ground-truth estimate sequence may be counted. This may result in number of counts equal to the square of the number of states. For example, the three states of vacant, sleep, and active may result in nine separate counts. The counts may be stored, for example, as a matrix, where the rows represent an original state and the columns represent the state that is transitioned to from the original state. The matrix may be normalized across its rows so that each row of the matrix sums to one, resulting in the transition probability matrix T. Each value in the transition probability matrix T may represent the probability of transitioning from the state of the value's row to the state of the value's column.

The sensor model may be any suitable model of the states of the various sensors in the environment. For example, the sensor model may be a lumped multi-sensor model. The lumped multi-sensor model may lump together the activity sensors in the environment as a single lumped activity sensor, and may lump together the presence sensors in the environment as a single lumped presence sensor. The sensor model may use two separate models, an activity sensor model for the lumped activity sensor, and an absence model for the lumped presence sensor.

The lumped multi-sensor model may generate an occupancy state estimate based on the lumped activity sensor according to:

$$P(x_k|z_k) = \frac{P(z_K|x_k)P(x_k|z_{k-1})}{P(z_k|z_{k-1})} \tag{2}$$

where $x_k$ may be a current occupancy state of the environment, $z_k$ may be a state of the sensors of the environment as updated at the current time step, and $z_{k-1}$ may be a state of the sensors of the environment at the immediately previous time step. $P(z_k|x_k)$ may represent the emission probabilities of the hidden states of a HMM, for example, a probability that the current state of the sensors of the environment would be seen based on a particular occupancy state of the environment. $P(x_k|z_{k-1})$ may represent a prior belief state for the current occupancy state of the environment, for example, the probability that the current occupancy state of the environment is x, as determined at time k using a state of the sensors that was determined at time k−1. $P(z_k|z_{k-1})$ may represent a normalization term. The lumped activity sensor model may thus update the occupancy state estimate given an update to the state of the sensors in the environment, for example, based on reports received from the sensors. The occupancy state estimate generated by the transition model may be the state x at time k for which the probability $P(x_k|z_k)$ is highest.

The probability distribution of $P(x_k|z_k)$ across all the possible occupancy states of the environment may be determined by combining the values of the activity sensors over time from the resampled event logs for the activity sensors generated for each sensor with the ground-truth estimate sequence generated by the ground-truth occupancy model. The number of times the various different combinations of activity sensor states corresponds to an estimated occupancy state may be counted. For example, the environment may include three activity sensors. At an interval of 12:05:00 am, the first sensor may have a state of false, the second sensor may have a state of false, the third sensor may have a state of false, and the ground-truth estimate sequence may have an occupancy state of vacant. This may result in a count of one for the sensor readings of false, false, and false corresponding to a state of vacant. At an interval of 12:10:00 am, the first sensor may have a state of false, the second sensor may have a state of true, the third sensor may have a state of false, and the ground-truth estimate sequence may have an occupancy state of active. This may result in a count of one for the sensor readings of false, true, and false corresponding to a state of active.

The counts of the number of times combinations of sensors state correspond to estimated occupancy states may be used to determine n-wise joint probabilities, which may be the probabilities for all combinations of n sensors that their state is false when the combination of activity sensor states corresponds to an estimated occupancy state. The n-wise joint probabilities may be determined for all possible integer values of n greater than one and less than total number of activity sensors in the environment. For example, with three activity sensors in the environment, only two-wise joint probabilities may be determined. With four activity sensors in the environment, both two-wise and three-wise joint probabilities may be determined.

The n-wise joint probabilities may be converted into the probability distribution $P(x_k|z_k)$ for the lumped activity sensor. The lowest probability among the n-wise joint probabilities for any combination of n sensors that corresponds to an estimated occupancy state may be the probability given to that estimated occupancy state in the probability distribution for the lumped activity sensor when the state of the lumped activity sensor is false, and the inverse of this lowest probability may be the probability given to that estimated occupancy state in the probability distribution for the lumped activity sensor when the state of the lumped activity sensor is true. This may result in the probability distribution $P(x_k|z_k)$ for the lumped activity sensor including a probability for every occupancy state x of the environment given any state z of the lumped activity sensor. The probability distribution $P(x_k|z_k)$ for the lumped activity sensor may be used by the activity sensor model to generate an estimated occupancy state of the environment based on a current state of the lumped activity sensor, as determined from the sensor feature data for the activity sensors.

A probability distribution for the absence sensor model may also be determined similarly to the probability distribution for the activity sensor model, using the resampled event logs for the presence sensors. The absence sensor model may be used when the lumped presence sensor has a state of false, indicating that none of the presence sensors in the environment detect the presence of any occupant in the environment as of the last report from any sensor in the environment. The absence sensor model may generate an estimated occupancy state of the environment similarly to the activity sensor model, using the probability distribution for the absence sensor model and the sensor feature data from the presence sensors. When the absence sensor model is used, the occupancy state estimate generated by the absence sensor model may be used as output from the online occupancy model in place of the occupancy state estimate generated by the activity sensor model. The absence sensor model may be used until any of the activity sensors or presence sensors has a state of true.

The probability distribution for the lumped activity sensor, probability distribution for the lumped presence sensor, and transition probability matrix may be updated when the ground-truth occupancy model updates the ground-truth estimate sequence, which may be, for example, once per day. When the online occupancy model is used to generate an occupancy state estimate, the ground-truth estimate sequence may be checked to determine if it has been updated since the last time the online occupancy model generated an occupancy state estimate. For example, the ground-truth occupancy model may update the ground-truth estimate sequence once per hour, on the hour. The online occupancy model may generate an occupancy state estimate at 12:43:12 am, and then may generate an online occupancy state estimate at 1:03:56 am. The ground-truth occupancy model may have updated the ground-truth estimate sequence at 1:00:00 am. The probability distribution for the lumped activity sensor, probability distribution for the lumped presence sensor, and transition probability matrix may be updated at 1:03:56 am, before being used to generate the occupancy state estimate, in order to reflect the updates to the ground-truth estimate sequence. This may allow the ground-truth estimate sequence to be used to train the online occupancy model, including training both the transition model and the sensor model.

In some implementations, the online occupancy model may be, for example, model for a machine learning system. The machine learning system model may be, for example, a Bayesian network, neural network, support vector machine, a learning classifier, a decision-tree model, a statistical or heuristic model, or any other suitable machine learning model that use supervised learning. The machine learning system model may be trained using, for example, ground-truth occupancy data and sensor data collected from various environments, such as smart homes and offices. The machine learning system model may be used at the online occupancy model to generate a current occupancy state estimate for an environment based on the current states and timestamps for the sensors of the environment as stored on the hub computing device or on the remote computing device.

The occupancy state estimate generated by the online occupancy model may be used in any suitable manner. For example, the hub computing device may use the occupancy state estimate to adjust a thermostat, alarm system, or other controllable devices of the environment. The hub computing device may, for example, adjust the thermostat setting so that less power is used and turn on the alarm system, including, for example, security cameras, when the occupancy state estimate is vacant. The hub computing device may turn lights off when the occupancy state estimate is sleep, and may control locks to lock the entryways to an environment when the occupancy state estimate is vacant.

The ground-truth estimate sequence may be used in any suitable manner. For example, the hub-computing device may use the ground-truth estimate sequence to determine a schedule for the occupants of the environment. The schedule may be used to, for example, control the thermostat, alarm system, locks, and other controllable devices, for example, to prepare an environment for the arrival of occupants after it has been vacant. The schedule may also be used in conjunction with the occupancy state estimates from the online occupancy model to detect anomalies. For example, when the occupancy state estimates vary from the schedule determined from the ground-truth estimate sequence, this may indicate an anomalous condition of the environment, or of the occupants of the environment.

The ground-truth estimate sequence may be used to assess the online occupancy model based on stored current occupancy state estimates. For example, comparisons between the history of current occupancy state estimates and the ground-truth estimate sequence may be used to assess an accuracy of the online occupancy model, a Matthews correlations coefficient, a false positive rate and false negative rate of the online occupancy model, a lag in the current occupancy state estimate when compared to the ground-truth estimate sequence, or an amount by which the online occupancy state estimate is ahead of the ground-truth estimate sequence.

The granularity of the occupancy state estimates may be increased by, for example, adding additional occupancy states to the ground-truth occupancy model and the online occupancy model. For example, the number of occupancy states may be expanded to include more detailed states, such as occupancy states that indicate which occupants are present in the environment, where occupants are located in an environment when the environment is not vacant, and what activities the occupants who are present are engaged in.

FIG. 1 shows an example system suitable for online occupancy state estimation according to an implementation of the disclosed subject matter. A hub computing device 100 may include a signal receiver 110, an occupancy estimator 120, and storage 140. The hub computing device 100 may be any suitable device, such as, for example, a computer 20 as described in FIG. 16, for implementing the signal receiver 110, the occupancy estimator 120, and the storage 140. The hub computing device 100 may be, for example, a controller 73 as described in FIG. 14. The hub computing device 100 may be a single computing device, or may include multiple connected computing devices, and may be, for example, a smart thermostat, other smart sensor, smartphone, tablet, laptop, desktop, smart television, smart watch, or other local or remote computing device, such as a remote server system, that may be able to act as a hub for a smart environment, which may include a security system and automation functions. The smart environment may be, for example, a smart home environment that may be controlled from the hub computing device 100. The hub computing device 100 may also include a display. The signal receiver 110 may be any suitable combination of hardware or software for receiving signals generated by sensors that may be part of the smart home environment and may be connected to the hub computing device 100. The occupancy estimator 120 may be any suitable combination of hardware and software generating an occupancy state estimate and a ground-truth estimate sequence for the environment. Event logs 141, resampled event logs 142, sensor states 143, ground-truth occupancy model 144, ground-truth estimate sequence 145, online occupancy model 146, may be stored the storage 140 in any suitable manner.

The hub computing device 100 may be any suitable computing device for acting as the hub of a smart environment, such as a smart home environment. For example, the hub computing device 100 may be a smart thermostat, which may be connected to various sensors throughout an environment as well as to various systems within the environment, such as HVAC systems, or it may be another computing device within the smart home environment or located remotely from the smart home environment, such as, for example, a remote server system. The hub computing device 100 may include any suitable hardware and software interfaces through which a user may interact with the hub computing device 100. For example, the hub computing device 100 may include a touchscreen display, or may include web-based or app based interface that can be accessed using another computing device, such as a smartphone, tablet, or laptop. The hub computing device 100 may be located within the same environment as the smart home environment it controls, or may be located offsite, for example, as a remote server system. An onsite hub computing device 100 may use computation resources from other computing devices throughout the environment or connected remotely, such as, for example, as part of a cloud computing platform. The hub computing device 100 may be used to arm a security system of the smart home environment, using, for example, an interface on the hub computing device 100. The security system may be interacting with by a user in any suitable matter, including through a touch interface or voice interface, and through entry of a PIN, password, or pressing of an "arm" button on the hub computing device 100.

The hub computing device 100 may include a signal receiver 110. The signal receiver 110 may be any suitable combination of hardware and software for receiving signals from sensors connected to the hub computing device 100. For example, the signal receiver 110 may receive signals from any sensors distributed throughout a smart home environment, either individually or as part of sensor devices. The sensors may be any suitable sensors, including, for example, activity sensors such as passive infrared sensors, and presence sensors, such as geo-fence monitors. The signal receiver 110 may receive any suitable signals from the sensors, including, for example, audio and video signals, signals indicating light levels, signals indicating detection or non-detection of motion, signals whether entryways are open, closed, opening, closing, or experiencing any other form of displacement, signals indicating the current climate conditions within and outside of the environment, smoke and carbon monoxide detection signals, and signals indicating the presence or absence of occupants in the environment based on Bluetooth or WiFi signals and connections from electronic devices associated with occupants or fobs carried by occupants. The signal receiver 110 may pass received signals to other components of the hub computing device 100 for further processing, such as, for example, detection of tripped motion and entryway sensors and use in automation and security determinations, and for storage. The signal receiver 110 may also be able to receive, or to associate with a received signal, an identification for the sensor from which the signal was received. This may allow the signal receiver 110 to distinguish which signals are being received from which sensors throughout the smart home environment. The signal receiver 110 may be able to filter signals based on type of sensor that generated the signal. For example, the signal receiver may be able to send only signals generated by sensors relating to the occupancy state of the environment to the occupancy estimator 120.

The signals received by the signal receiver 110 from the sensors may be reports from the sensors. The signal receiver 110 may store the reports from the sensors in the event logs 141, including a timestamp and a value for each report received from a sensor. The signal receiver 110 may update the states of sensors in the sensor states 143 based on reports received from sensors. For example, when a report is received from a sensor, the signal receiver 110 may use the value and timestamp in the report to update the state of the sensor and timestamps for the sensor in the sensor states 143, including the current timestamp and any transition timestamps that may need to be updated based on the value in the report.

The hub computing device 100 may include an occupancy estimator 120. The occupancy estimator 120 may be any suitable combination of hardware and software for generating an occupancy state estimate and ground-truth estimate sequence for the environment based on the signals from the various sensors. The occupancy estimator 120 may use any suitable models or machine learning systems to generate an occupancy state estimate and ground-truth estimate sequence for the environment. For example, the occupancy estimator 120 may use the ground-truth occupancy model 144 to generate the ground-truth occupancy state estimate, and may use the online occupancy model 146 to generate current occupancy state estimates. The ground-truth occupancy model 144 may use sets of rules, or heuristics, to generate occupancy state estimates for the ground-truth estimate sequence 145. The online occupancy model 146 may use a transition model and a sensor model to generate current occupancy state estimates for the environment. The sensor model may include an activity sensor model and a presence sensor model.

The storage 140 may be any suitable storage hardware connected to the hub computing device 100, and may store the event logs 141, resampled event logs 142, sensor states 143, ground-truth occupancy model 144, ground-truth estimate sequence 145, and online occupancy model 145, in any suitable manner. For example, the storage 140 may be a component of the hub computing device, such as a flash memory module or solid state disk, or may be connected to the hub computing device 100 through any suitable wired or wireless connection. It may be a local storage, i.e., within the environment within which the hub computing device operates, or it may be partially or entirely operated by a remote service, such as a cloud-based monitoring service as described in further detail herein. The event logs 141 may include data from reports received from sensors, including timestamps and values. The resampled event logs 142 may include resampled event logs for the activity sensors and resampled event logs for the presence sensors, which may be generated by pre-processing data for the sensors in the event logs 141, resampling the pre-processed event logs to include timestamps that occur on set intervals, and combining the pre-processed event logs for sensors of the same type to represent a lumped sensor in the resampled event logs 141. The sensor states 143 may store the current states of the sensors based on the most recent reports from the sensors and previous state transitions made by the sensors. The ground-truth estimate sequence 145 may be a log of occupancy state estimates generated by the ground-truth occupancy model 144, including occupancy state estimates at times that occur on set intervals that cover any suitable period of time.

Figure 2:
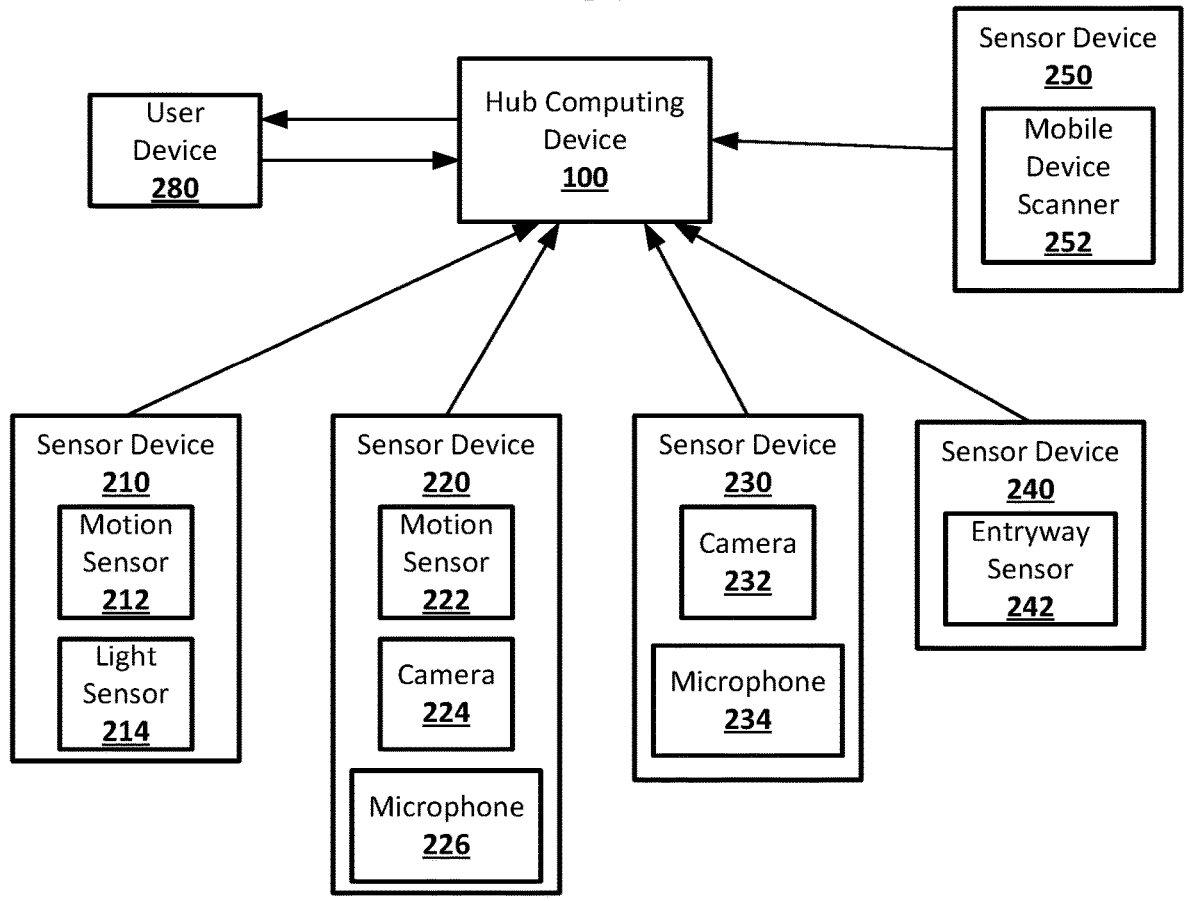
FIG. 2 shows an example arrangement suitable for online occupancy state estimation according to an implementation of the disclosed subject matter.

FIG. 2 shows an example arrangement suitable for online occupancy state estimation according to an implementation of the disclosed subject matter. The hub computing device 100 may be the hub, or controller, for a smart home environment. Various sensor devices throughout the environment may be connected to the hub computing device 100. Each sensor device may have any suitable assortment of sensors. For example, the sensor devices 210, 220, 230, 240 and 250 may be connected to the hub computing device 100. The sensor device 210 may include a motion sensor 212 and a light sensor 214. The sensor device 220 may include a motion sensor 222, a camera 224, and a microphone 226. The sensor device 230 may include a camera 232 and a microphone 234. The sensor device 240 may include an entry sensor 242. The sensor device 250 may include a mobile device scanner 252. The motions sensors 212 and 222 may be any suitable sensors for detecting motion in an environment, such as, for example, a low power motion sensor using a passive infrared sensor to detect the motion of heat. The light sensor 214 may be any suitable sensor for detecting light levels within an environment. The entryway sensor 242 may be any suitable type of sensor, such as contact sensors, including magnetic contact sensors, and tilt sensors, for detecting when an entryway is open. For example, the entryway sensor 242 may be a sensor attached to a bedroom window in a home, and may detect when the bedroom window has been moved in any way, for example moved towards an open or closed position, and may also measure vibrations or impacts experienced by the window. The mobile device scanner 252 may use WiFi, Bluetooth, RFID, or any other suitable wireless protocol to detect the presence of mobile personal computing devices or fobs associated with occupants of the environment, including, for example, smartphones known to belong to residents of the environment, smartphones that are not recognized as belonging to a resident of the environment, and fobs or RFID tags used on pets. The mobile device scanner 252 may, for example, monitor the location of a known mobile device relative to a geo-fence, and may determine when the mobile devices enter or exit the geo-fence. The mobile device scanner 252 may be a separate physical sensor device, or may be any suitable combination of hardware and software on the hub computing device 100 or other component of the smart home environment.

The sensors of the sensors devices 210, 220, 230, 240, and 250 may generate signals that may be received by the signal receiver 110 of the hub computing device 100. The signals may be the product of active output the sensors, for example, a video or audio signal produced by the camera 224 or microphone 226, or may be the result of a sensor not generating any output, for example, a lack of output from the motion sensor 212 when no motion is detected. The signals may include data that may be a report from the sensors. The sensors may only generate reports when a value generated by the sensor based on the environment has changed. For example, a passive infrared sensor may generate a value between 0 and 255 to indicate the level of movement of a heat source in the field of vision of the passive infrared sensor, with 0 indicating no movement of a heat source. The passive infrared sensor may send a report when the value changes, for example, due to a heat source moving into, out of, or within the field of vision of the passive infrared sensor.

The hub computing device 100 may also be connected, in any suitable manner, to a user computing device 280. The user computing device 280 may be any suitable computing device, such as, for example, a smartphone, tablet, laptop, or smartwatch or other wearable computing device, which a user may use to interface with the hub computing device 100 and control the security system. The hub computing device 100 may be able to send notifications, alerts or requests to the user computing device 280, either through a direct connection, such as LAN connection, or through a WAN connection such as the Internet. This may allow the user of the user computing device 280 to monitor and manage the smart home environment even when the user is not physically near the hub computing device 100. For example, current occupancy state estimates, or the ground-truth estimate sequence, may be sent to the user computing device 280.

Figure 3:
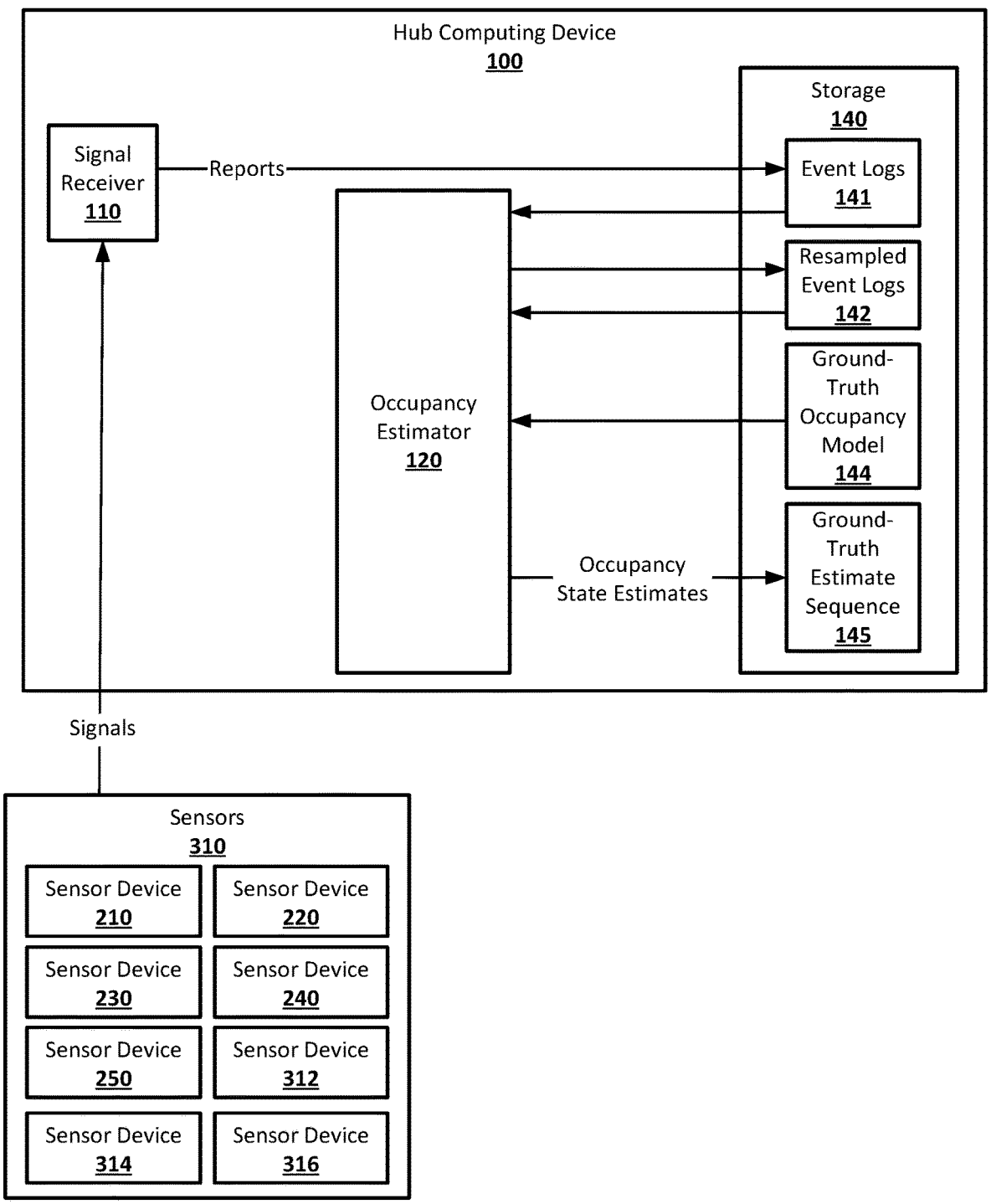
FIG. 3 shows an example arrangement suitable for online occupancy state estimation according to an implementation of the disclosed subject matter.

FIG. 3 shows an example arrangement suitable for online occupancy state estimation according to an implementation of the disclosed subject matter. The signal receiver 110 may receive signals from various sensors 310 distributed throughout the environment. The sensors 310 may include the sensors on the sensor devices 210, 220, 230, 240, 250, 312, 314, and 316, including, for example, activity sensors, such as passive infrared sensors, and presence sensors, such as geo-fence monitors. Other sensors which may send signals to the signal receiver 110 may include smoke detectors, carbon monoxide detectors, entryway sensors, smart light switches, and the like, which may be classified as presence sensors, activity sensors, or may classified as another type of sensor for the purposes of generating a lumped sensor. The signals received from the sensors 310 may indicate the current state of the aspect of the environment monitored by each of the sensors 310. The signals may carry data the includes reports from the sensors 310, which may include values from the sensors and corresponding timestamps. Timestamps may also be applied to the reports when they are received at the signal receiver 110. The signal receiver 110 may store the reports as part of the event logs 141. The event logs 141 may include reports from all of the sensors 310, which may be in separate logs, or may be sortable by sensor.

The occupancy estimator 120 may use the event logs 141 to generate the resampled event logs 142 in order to generate or update the ground-truth estimate sequence 145. For example, the hub computing device 100 may generate or update the ground-truth estimate sequence 145 at any suitable time, and on any suitable schedule, such as, for example, once per hour. The occupancy estimator 120 may pre-process and resample the event logs 141 to generate the resampled event logs 142, which may include the individual resampled event logs for individual sensors, and may also include the lumped resampled event logs for each sensor type. For example, if the sensors 310 in the environment include activity sensors and presence sensors, the resampled event logs 142 may include a lumped resampled event log for the activity sensors and a lumped resampled event log for the presence sensors. The resampled event logs 142 may include timestamps at any suitable intervals and associated inferred states of the sensor or lumped sensor represented by the resampled event logs. For example, the resampling interval may be 5 minutes. The timestamps and states in the resampled event logs 142 may cover any suitable time period, including, for example, the same time period over which reports have been stored in the event logs 141. The resampled event logs 142 may not be generated anew each time the hub computing device 100 generates or updates the ground-truth estimate sequence 145. For example, the resampled event logs 142 may be updated from the previous time the hub computing device 100 generated or updated the ground-truth estimate sequence 145 based on reports stored in the event logs 141 since the last generation or updating of the ground-truth estimate sequence 145.

The occupancy estimator 120 may use the ground-truth occupancy model 143 from the storage 140 to generate the ground-truth estimate sequence 145 from the resampled event logs 142. For example, the ground-truth occupancy model 143 may include rules, or heuristics, which may be applied to the lumped resampled event logs, for example, for the activity sensors and the presence sensors, and any other lumped resampled event logs for a type of sensor in the resampled event logs 142. The ground-truth estimate sequence 145 may include an occupancy state estimate for the environment monitored by the sensors 310 for every interval in the resampled event logs 142. The occupancy estimator 120 may generate new occupancy state estimates for intervals which do not already have an occupancy state estimate, and may update previously made occupancy state estimates, for example, to incorporate reports from the sensors 310 received after the occupancy state estimate was made. For example, if the occupancy state estimator 120 generates or updates the ground-truth estimate sequence 145 once every hour on the hour, an occupancy state estimate for 12:00:00 am may be generated at 12:00:00 am, and may be updated when the next occupancy state estimates are generated at 1:00:00 am based on reports that were received after 12:00:00 am. This may allow the occupancy state estimates in the ground-truth estimate sequence 145 to be both forward and backward looking. An occupancy state estimate may be of any suitable granularity, for example, depending on the sensors 310 and the complexity of the ground-truth occupancy model 143. For example, an occupancy state estimate may be a single state for the environment, such as active, sleep, or vacant, or may include, for example, an indication of the number and identity of occupants in the environment, whether the occupants are residents, known guests, or unknown, the number of pets in the environment, the location of occupants and pets within the environment, whether any occupants have recently entered or exited the environment, whether any occupants are expected to enter or exit the environment in the near future, the length of time an occupant who is a resident has been present in or absent from the environment, and any other suitable information regarding the occupancy state of the environment.

Figure 4:
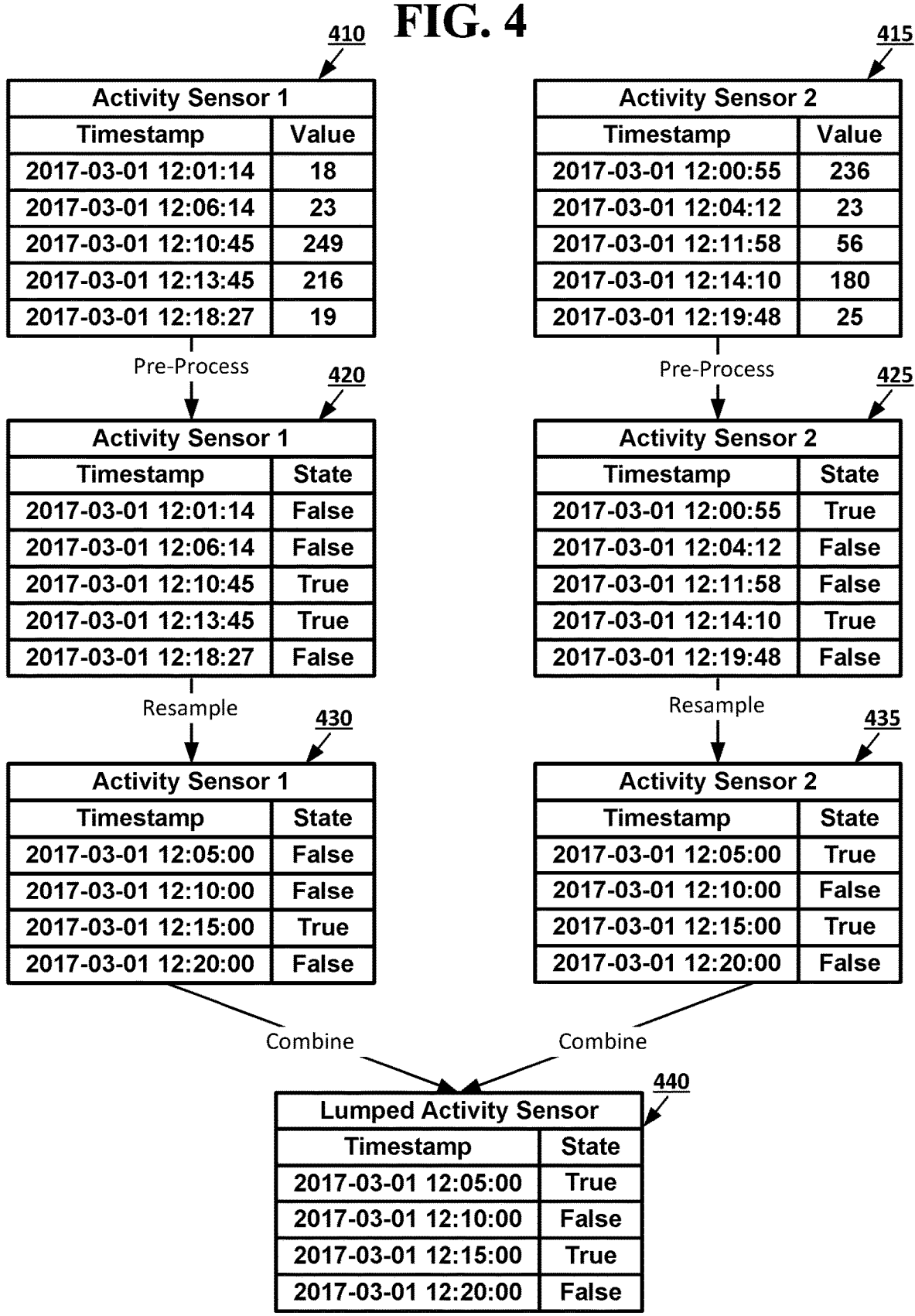
FIG. 4 shows an example arrangement suitable for online occupancy state estimation according to an implementation of the disclosed subject matter.

FIG. 4 shows an example arrangement suitable for online occupancy state estimation according to an implementation of the disclosed subject matter. An event log 410 may include timestamps and values from reports received from a first activity sensor in the environment, as stored with the event logs 141 by the signal receiver 110. An event log 415 may include timestamps and values from reports received from a second activity sensor in the environment, as stored with the event logs 141 by the signal receiver 110.

When the occupancy estimator 120 generates or updates the ground-truth estimate sequence, the event log 410 may be pre-processed to generated pre-processed event log 420 for the first activity sensor. For example, the values from the event log 410 may be mapped to states for the activity sensor. The event log 415 may similarly be pre-processed to generated pre-processed event log 425 for the second activity sensor.

The occupancy estimator 120 may then resampled the pre-processed event logs 420 and 425. The resampling may infer the states of the sensor at timestamps at set intervals over the period of time covered by the event logs 410 and 415 based on the states and timestamps in the event logs 420 and 425. For example, the intervals may be every 5 minutes, starting at the first time evenly divisible by 5 minutes after the earliest timestamp in the event logs 410 and 415, and ending at the first time evenly divisible by 5 minutes after the latest timestamp in the event logs 410 and 415. After the occupancy estimator 120 has previously generated the ground-truth estimate sequence 145, the first time for an interval may be the next interval after the last interval in the ground-truth estimate sequence 145. For example, the resampled event log 430 for the first activity sensor may include a timestamp interval every 5 minutes, and may infer the state of the first activity sensor at each of the timestamp intervals based on the states of the sensor, and corresponding timestamps, in the pre-processed event log 420. The resampled event log 435 may be generated similarly for the second activity sensor from the pre-processed event log 425.

The occupancy estimator 120 may combine the resampled event logs 430 and 435 to generated a lumped resampled event log 440 for activity sensors, including the first and second activity sensor. States with the same timestamp from the resampled event logs 430 and 435 may be ORed together to generate a state for the that timestamp for the lumped resampled event log 440 for a lumped activity sensor. For example, the resampled event log 430 may include a state of false at timestamp interval Mar. 1, 2017 12:05:00 am, and the resampled event log 435 may include a state of true at that timestamp interval. The state for the timestamp interval Mar. 1, 2017 12:05:00 am in the lumped resampled event log 440 may be true.

The occupancy estimator 120 may similarly generate lumped resampled event logs based on the event logs 141 for the presence sensors, or for any other sensor types with reports stored in the event logs 141. Each lumped resampled event log may represent a lumped sensor including any suitable number of sensors of the same type. For example, a lumped resampled event log may represent a lumped activity sensor that includes all of the activity sensors among the sensors 310, or include some subset of the activity sensors among the sensors 310.

Figure 5:
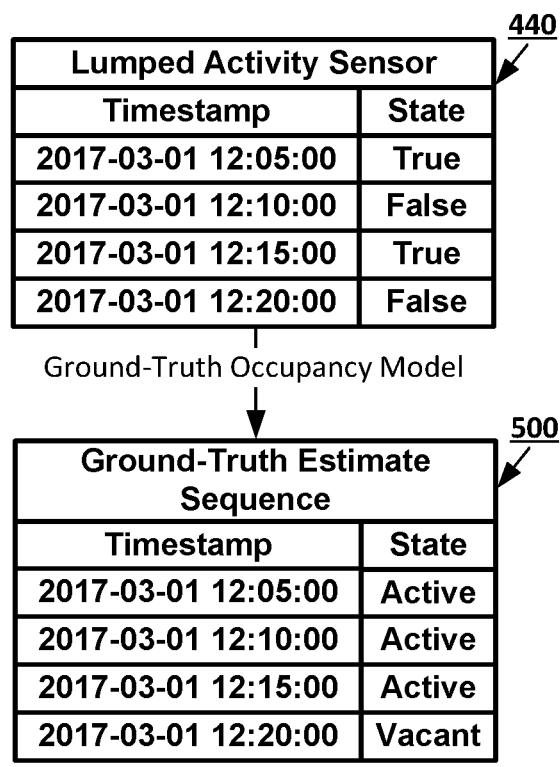
FIG. 5 shows an example arrangement suitable for online occupancy state estimation according to an implementation of the disclosed subject matter.

FIG. 5 shows an example arrangement suitable for online occupancy state estimation according to an implementation of the disclosed subject matter. The occupancy estimator 120 may use the ground-truth occupancy model 144 and lumped resampled event logs from the resampled event logs 142 to generate a ground truth estimate sequence such as the ground-truth estimate sequence 145. For example, the ground-truth occupancy model 144 may be applied to the lumped resampled event log 440 for the first and second activity sensors to generate a ground-truth estimate sequence 500. The ground-truth occupancy model 144 may apply, for example, rules or heuristics to the lumped resampled event log 440. The occupancy estimator 120 may apply the ground-truth occupancy model 144 to any other lumped resampled event logs generated by the occupancy estimator 120, for example, a lumped resampled event log for presence sensors, generated along with the lumped resampled event log 440, to generate the ground-truth estimate sequence 500. The ground-truth estimate sequence 500 may include an occupancy state estimate for the environment monitored by the sensors 310 for each timestamp interval in the lumped resampled event logs, such as the lumped resampled event logs 440. In some instances, the occupancy estimator 120 may update a previously made occupancy state estimate in the ground-truth estimate sequence.

Figure 6:
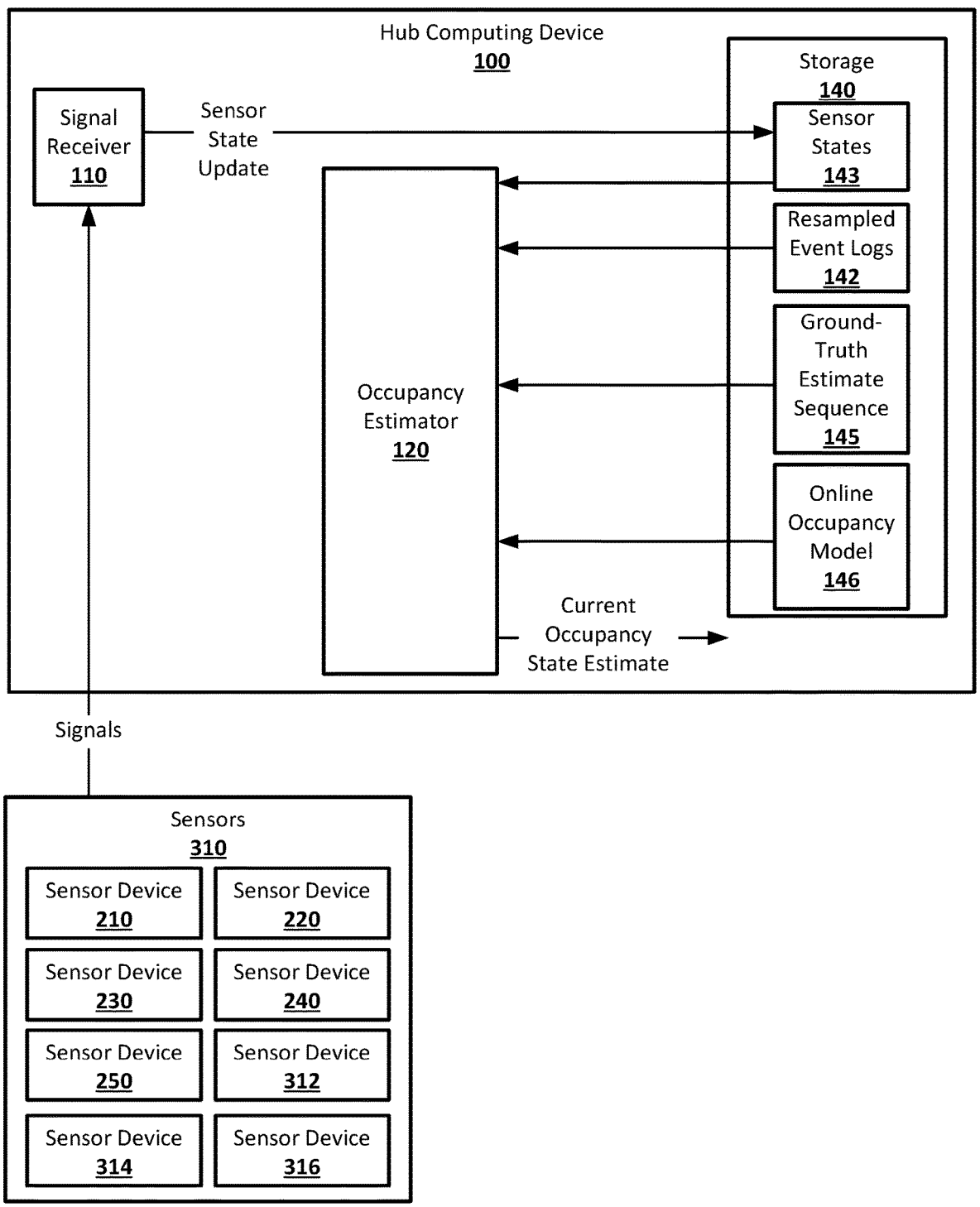
FIG. 6 shows an example arrangement suitable for online occupancy state estimation according to an implementation of the disclosed subject matter.

FIG. 6 shows an example arrangement suitable for online occupancy state estimation according to an implementation of the disclosed subject matter. The signal receiver 110 may use the timestamps and values from the reports received from the sensors 310 to update the sensor states 143 in the storage 140. Each of the sensors 310 may have a sensor state tracked in the sensor states 143. The sensor state updates from the signal receiver 110 may be generated whenever a report is received from any of the sensors 310, and may update the state of the sensor based on the value in the report, a current timestamp indicating when the last report was received from the sensor, and any transition timestamps for the sensor when the value in the report causes the state of the change. For example, a sensor update may cause the state of an activity sensor to change from false to true, which may result in a timestamp indicating the last transition to true for the activity sensor to be updated to match the current timestamp, which may be the timestamp of the report.

The occupancy estimator 120 may use the sensor states 143, the resampled event log 142, and the ground-truth estimate sequence 145 to generate a current occupancy state estimate for the environment. For example, the hub computing device 100 may generate the current occupancy state estimate whenever a report is received from one of the sensors 310 that causes the sensor to change to a different state from its current state. The occupancy estimator 120 may apply the online occupancy model 146 to the sensor states 143 to generate the occupancy state estimate. The online occupancy model 146 may include, for example, a transition model and sensor model, which may be based on a HMM of the possible states of the environment and the possible states the sensors 310. The transition model may, for example, use a transition probability matrix generated from the ground-truth estimate sequence 145 to determine the possible occupancy state of the environment for which there is the highest probability that the environment has transitioned to that possible occupancy state based on the sensor states 143 and the occupancy state estimate for the environment previous that is current when the online occupancy model 146 is used. The sensor model may, for example, use a lumped sensor probability distribution based on the resampled event logs 142 and the ground-truth estimate sequence 145 to determine the possible occupancy state of the environment that has the highest probability of being the current occupancy state of the estimate based on the sensor states 143. The sensor model may be used with lumped sensors, and may use different models for each type of lumped sensor. For example, the sensor model may be used with both a lumped activity sensor, using an activity model, and a lumped presence sensor, using an absence model.

The occupancy estimator 120 may generate occupancy state estimates for any intervals between the last time the occupancy estimator 120 generated a current occupancy state estimate using the online occupancy model 146 and the current time. For example, if the current time is 6:03:12 am, and the online occupancy model 146 was last used by the occupancy estimator 120 at 5:43:12 am, the last interval for which an occupancy state estimate was made may be 5:45:00 am. The online occupancy estimator 120 may use the online occupancy model 146 to generate occupancy state estimates for 5:50:00 am, 5:55:00 am, 6:00:00 am, and 6:05:00 am, the last of which may be the current online occupancy state estimate. When the online occupancy model 146 includes a transition model and a sensor model, the occupancy estimator 120 may use the transition model and sensor model alternatively. For example, the transition model may be used to generate the occupancy state estimate for 5:50:00 am, the sensor model may be used to generate the occupancy state estimate for 5:55:00 am, and the transition model may be used to generate the occupancy state estimate for 6:00:00 am.

The current occupancy state estimate generated using the online occupancy model 146 may be a single state for the environment, such as active, sleep, or vacant, or may include, for example, an indication of the number and identity of occupants in the environment, whether the occupants are residents, known guests, or unknown, the number of pets in the environment, the location of occupants and pets within the environment, whether any occupants have recently entered or exited the environment, whether any occupants are expected to enter or exit the environment in the near future, the length of time an occupant who is a resident has been present in or absent from the environment, and any other suitable information regarding the occupancy state of the environment. The current occupancy state estimate may be used in any suitable manner. For example, the hub computing device 100 may use the current occupancy state estimate to control various aspects of a smart home environment, for example, adjusting a thermostat, locking and unlocking entryways, or setting the mode of a security system. The current occupancy state estimate may also be stored in the storage 140 in a log of current occupancy state estimates which may, for example, be later compared to the ground-truth estimate sequence to determine the accuracy of the online occupancy model 146.

Figure 7:
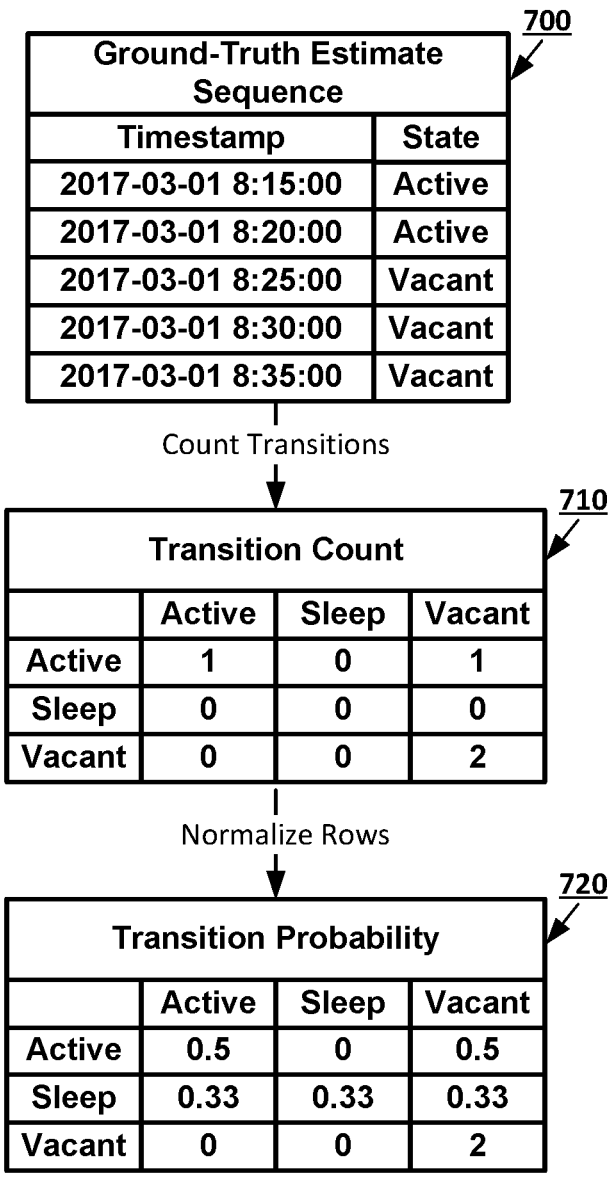
FIG. 7 shows an example arrangement suitable for online occupancy state estimation according to an implementation of the disclosed subject matter.

FIG. 7 shows an example arrangement suitable for online occupancy state estimation according to an implementation of the disclosed subject matter. The occupancy estimator 120 may generate a transition probability matrix to be used with a transition model of the online occupancy model 146. For example, the occupancy estimator 120 may count state transition in a ground-truth estimate sequence 700 to generate a transition count 710. The transition count 710 may include counts of transitions between the possible occupancy states of the environment, including self-transitions, as stored in ground-truth estimate sequence 700.

The occupancy estimator may normalize the transition count 710 by rows to generate a transition probability matrix 720. The transition probability matrix 720 may include the probability of transitions between possible occupancy states of the environment, as indicated by the transitions in the ground-truth estimate sequence 700.

Figure 8:
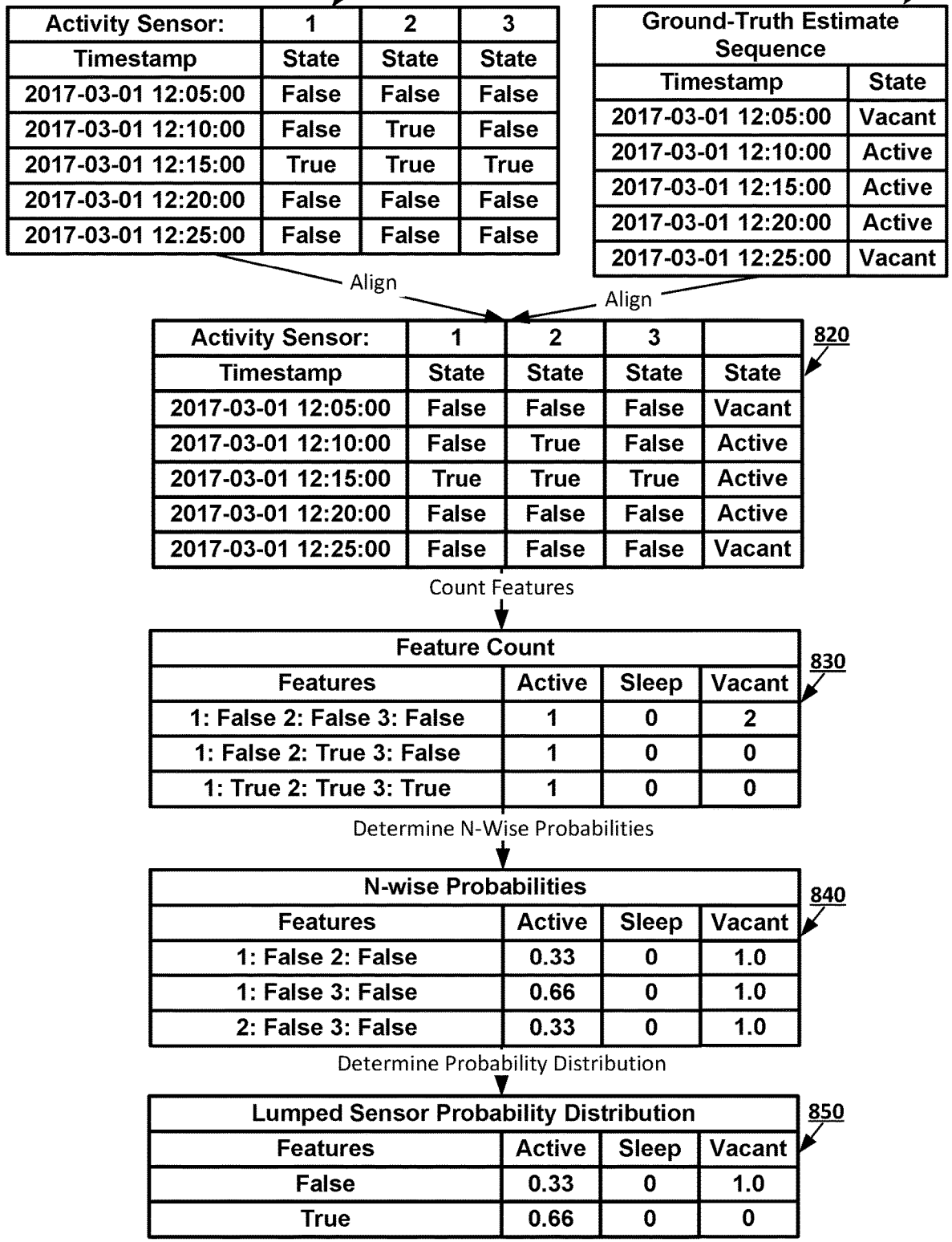
FIG. 8 shows an example arrangement suitable for online occupancy state estimation according to an implementation of the disclosed subject matter.

FIG. 8 shows an example arrangement suitable for online occupancy state estimation according to an implementation of the disclosed subject matter. The occupancy estimator 120 may generate a lumped sensor probability distribution to be used with a sensor model of the online occupancy model 146. For example, the occupancy estimator 120 may generate a lumped sensor probability distribution to be used with an activity model of a sensor model based on resampled event logs 800 for three activity sensors and a ground-truth estimate sequence 800. The resampled event logs 800 and the ground-truth estimate sequence 810 may be aligned, for example, associating the states of the three sensors at a given interval with the occupancy state estimate for the environment at that interval in the ground-truth estimate sequence 810, to generate an aligned event log 820.

The occupancy estimator 120 may count features in the aligned event log 820 to generate the feature count 830. For example, the occupancy estimator 120 may count the number of times in the aligned event log 820 a particular set of states for the three sensors are associated with a particular occupancy state estimate for the environment. The feature count 830 may include counts for all of the sets of states of the sensors available in the aligned event log 820.

The occupancy estimator 120 may determine n-wise probabilities from the feature count 830 to generate the n-wise probabilities 840. The n-wise probabilities 840 may, for example, be the probabilities that a particular occupancy state estimate for the environment is associated with a particular state for a set of n sensors, where n is more than one and less than the total number of sensors in the aligned event log 820.

The occupancy state estimator 120 may determine a lumped sensor probability distribution 850 from the n-wise probabilities 840. The lumped sensor probability distribution 850 may associate each possible occupancy state of the environment with a possible state of a lumped sensor, such as, for example, a lumped activity sensor including the three sensors included in the aligned event log 820. The lowest probability among the n-wise joint probabilities 840 for any combination of n sensors that corresponds to an possible occupancy state may be the probability given to that occupancy state in the lumped sensor probability distribution 850 for the lumped activity sensor when the state of the lumped activity sensor is false, and the inverse of this lowest probability may be the probability given to that estimated occupancy state in the lumped sensor probability distribution 850 for the lumped activity sensor when the state of the lumped activity sensor is true.

The occupancy estimator 120 may generate a lumped sensor probability distribution for each type of sensor with event logs stored in the event logs 141. For example, separate lumped sensor probability distributions may be generated for activity sensors and for presence sensors, for example, for use with the activity model and absence model, respectively.

Figure 9:
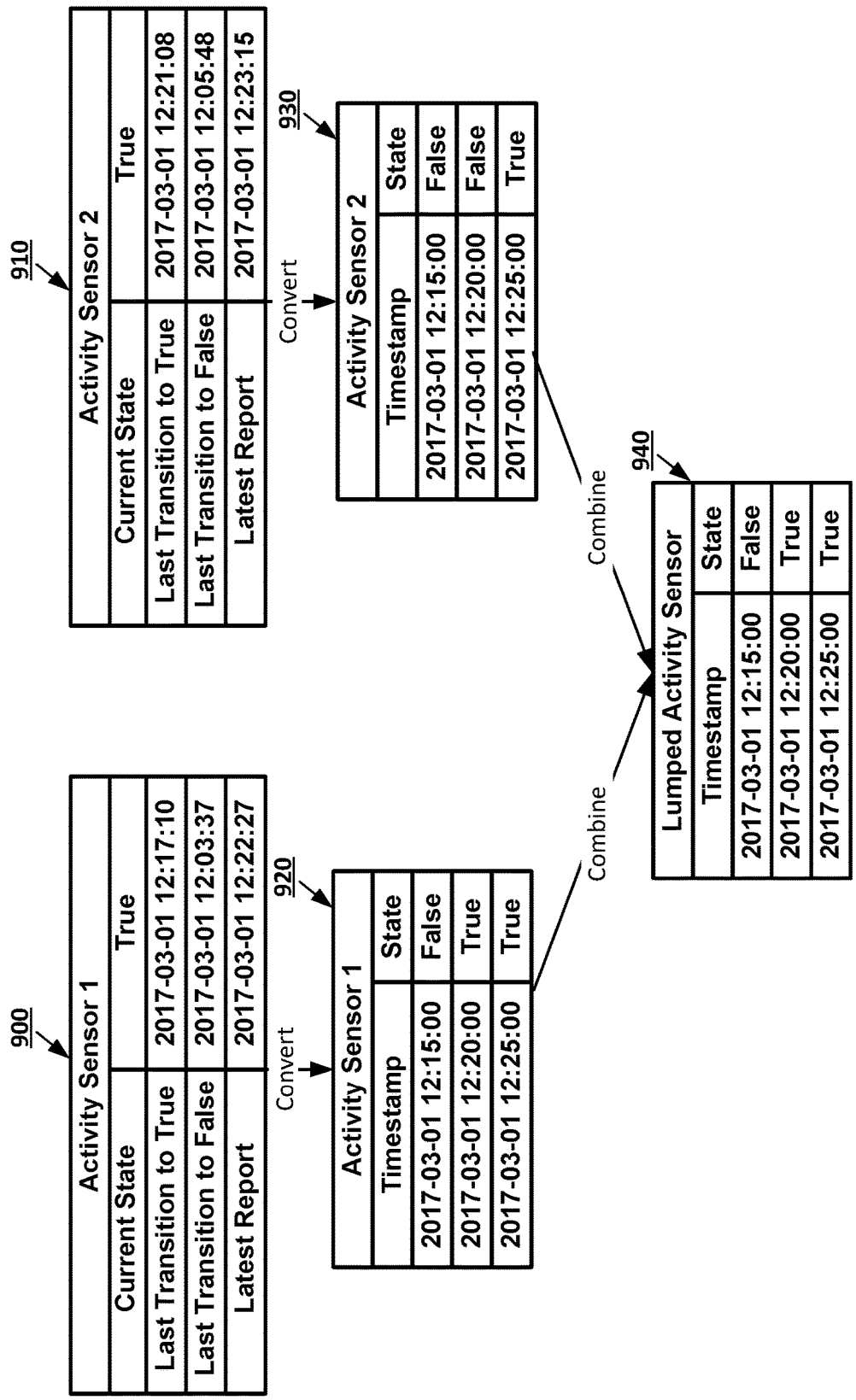
FIG. 9 shows an example arrangement suitable process suitable for online occupancy state estimation according to an implementation of the disclosed subject matter.

FIG. 9 shows an example arrangement suitable for online occupancy state estimation according to an implementation of the disclosed subject matter. The occupancy estimator 120 may convert a sensor state 900 of an activity sensor into sensor feature data 920. For example, the sensor state 900, including current state and timestamps, may be used to infer the state of the activity sensor at specified intervals starting with the previous interval for which a current occupancy state estimate was generated and ending at an interval after the most recent report from a sensor. Sensor feature data 930 may be similar generated based on a sensor state 910 for a second activity sensor. Sensor feature data may be generated for any other activity sensors with sensor states in the sensor states 143.

The occupancy estimator 120 may combine sensor feature data, such as the sensor feature data 920 and 930, to generate lumped activity sensor data 940. For example, the states of the sensors in sensor feature data 920 and 930 for the same timestamp intervals may be ORed together to determine the state for that timestamp interval in the lumped activity sensor data 940. The occupancy estimator 120 may apply the online occupancy model 146 to the lumped activity sensor data 940, for example, inputting the lumped activity sensor data 940 to a sensor model, to generate a current occupancy state estimate for the environment.

Figure 10:
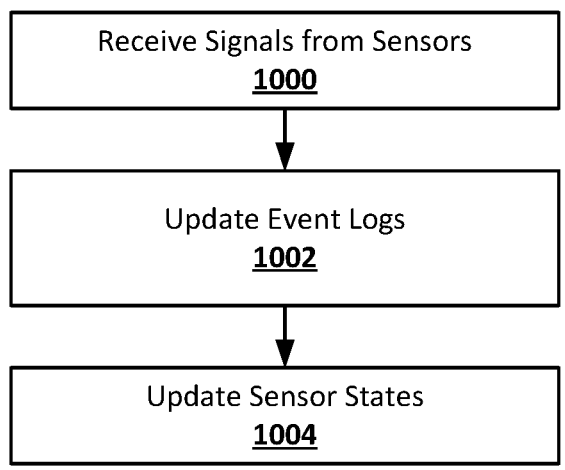
FIG. 10 shows an example of a process suitable for online occupancy state estimation according to an implementation of the disclosed subject matter.

FIG. 10 shows an example of a process suitable for online occupancy state estimation according to an implementation of the disclosed subject matter. At 1000, signals may be received from sensors. For example, the signal receiver 110 of the hub computing device 100 may receive signals from the sensors 310. The signals may carry data including reports from the sensors, which may include timestamps and values that indicate the state of the environment as currently detected by the sensors.

At 1002, event logs may be updated. For example, the signal receiver 110 may use the reports, including the timestamps and values, received from sensors to update the event logs 141 in the storage 140 of the hub computing device 100. Timestamps and values from a report received from a sensor may be added to the event logs 141 when the report is received at the signal receiver 110.

At 1004, sensor states may be updated. For example, the signal receiver 110 may use the reports, including the timestamps and values, received from sensors to update the sensor states 143 in the storage 140 of the hub computing device 100. The sensor states 143 may be updated by, for example, mapping values from reports to states for sensors, and updating current timestamps to the timestamps in the reports, and updating transition timestamps when the current states of sensors are changed based on reports. Timestamps and values from a report received from a sensor may be used to update the sensor state for the sensor when the report is received at the signal receiver 110.

Figure 11:
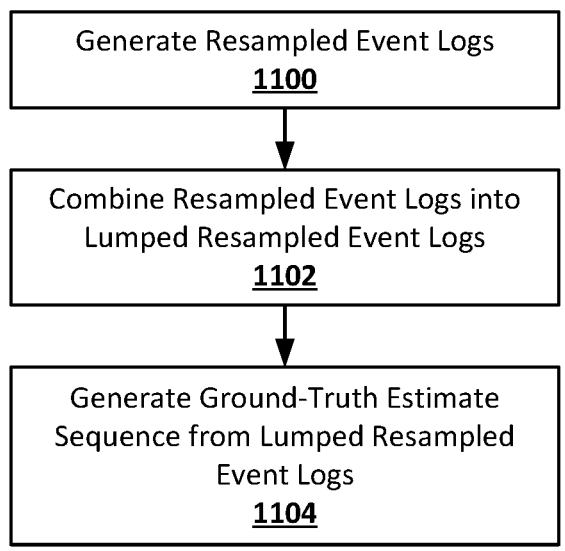
FIG. 11 shows an example of a process suitable for online occupancy state estimation according to an implementation of the disclosed subject matter.

FIG. 11 shows an example of a process suitable for online occupancy state estimation according to an implementation of the disclosed subject matter. At 1100, resampled event logs may be generated. For example, before the occupancy estimator 120 generates or updates the ground-truth sequence estimate 145, the occupancy estimator 120 may pre-process and resample the event logs 141 to generate the resampled event logs 142 for individual sensors.

At 1102, resampled event logs may be combined to generated lumped resampled event logs. For example, the occupancy estimator 120 may combine resampled event logs for sensors of the type into a lumped resampled event log for that type of sensor. Resampled event logs for activity sensors may be combined, for example, to generate a lumped resampled event log for activity sensors.

At 1104, a ground-truth estimate sequence may be generated from the lumped resampled event logs. For example, the occupancy estimator 120 may apply the ground-truth occupancy model 144 to the lumped resampled event logs generate for the different sensor types among the sensors 310. The ground-truth occupancy model may, using, for example, rules or heuristics, generate any suitable number of occupancy state estimates for the environment for any suitable number of intervals over any suitable period of time. The occupancy state estimates may make up the ground-truth estimate sequence 145 for the environment.

Figure 12:
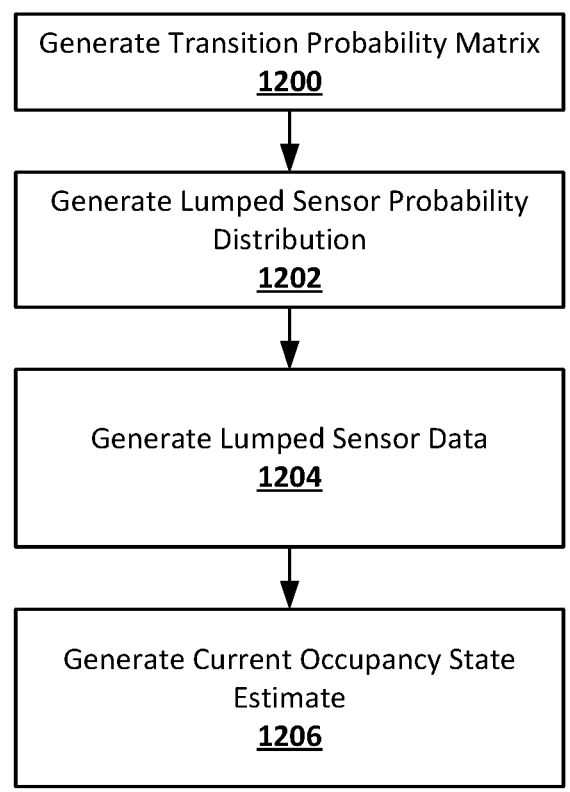
FIG. 12 shows an example of a process suitable for online occupancy state estimation according to an implementation of the disclosed subject matter.

FIG. 12 shows an example of a process suitable for online occupancy state estimation according to an implementation of the disclosed subject matter. At 1200, a transition probability matrix may be generated. For example, the occupancy estimator 120, before generating a current occupancy state estimate, may generate a transition probability matrix based on the environment's transitions between occupancy states in the ground-truth estimate sequence 145.

At 1202, lumped sensor probability distributions may be generated. For example, the occupancy estimator may use the resampled event logs 142 and the ground-truth estimate sequence 145 to generate lumped sensor probability distributions of for the different sensor types among the sensors 310. The occupancy estimator 120 may, for example, align the resampled event logs 142 and the ground-truth estimate sequence 145, perform a feature count, determine n-wise probabilities, and then generate a lumped sensor probability distribution from the n-wise probabilities.

At 1204, lumped sensor data may be generated. For example, the occupancy estimator 120 may generate sensor feature data for the sensors 310 using the sensor states 143. The sensor feature data may be used to generate lumped sensor data for the different sensor types among the sensors 310. States of sensors of the same type for the same timestamp interval may be ORed together to generate lumped sensor data for that type of sensor.

At 1206, a current occupancy state estimate may be generated. For example, the occupancy estimator 120 may apply the online occupancy model 146 to the lumped sensor data. The online occupancy model 146 may use a transition model, which may use the transition probability matrix, and a sensor model, which may use the lumped sensor probability distributions. The occupancy estimator 120 may generate occupancy state estimate for any intervals between the last interval for which a current occupancy state estimate was generated and the interval that is ahead of and closest to the current time. The occupancy estimator 120 may alternative between using a transition model and a sensor model when generating current occupancy state estimates. The sensor model may include a model for each sensor type among the sensors 310, such as, for example, an activity model for activity sensors and an absence model for presence sensors.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. In some cases, a sensor may operate as multiple sensor types sequentially or concurrently, such as where a temperature sensor is used to detect a change in temperature, as well as the presence of a person or animal.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 13:
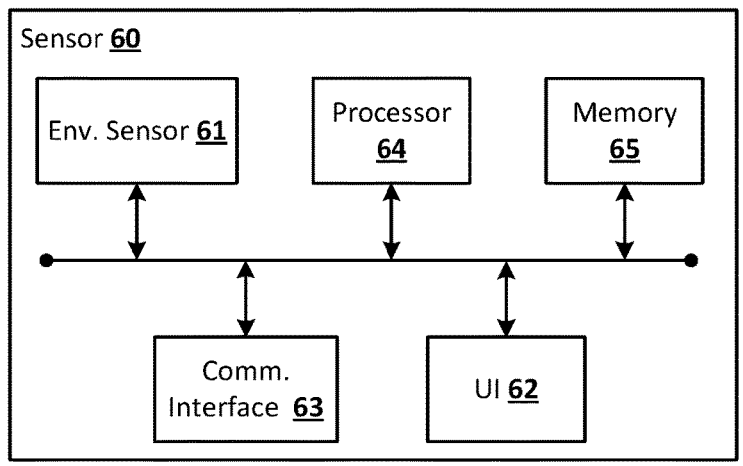
FIG. 13 shows a computing device according to an embodiment of the disclosed subject matter.

A sensor may include hardware in addition to the specific physical sensor that obtains information about the environment. FIG. 13 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 14:
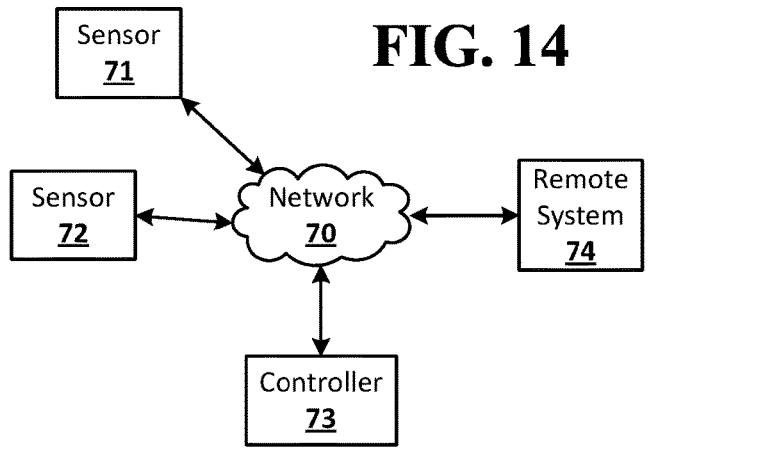
FIG. 14 shows a system according to an embodiment of the disclosed subject matter.

FIG. 14 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

For example, the hub computing device 100, the motion sensors 212 and 222, the camera 224, the microphone 226, and the entryway sensor 242, may be examples of a controller 73 and sensors 71 and 72, as shown and described in further detail with respect to FIGS. 1-5.

The devices of the security system and smart-home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The sensor network shown in FIG. 14 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 7 may include a plurality of devices, including intelligent, multi-sensing, network-connected devices that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 14.

According to embodiments of the disclosed subject matter, the smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 7, and the controller 73 may control the HVAC system (not shown) of the structure.

A smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 14, and the controller 73 may control an alarm system to provide a visual and/or audible alarm to the user of the smart-home environment.

A smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 14 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be the sensors 71, 72 shown in FIG. 14. The smart wall switches may detect ambient lighting conditions, and control a power and/or dim state of one or more lights. For example, the sensors 71, 72, may detect the ambient lighting conditions, and the controller 73 may control the power to one or more lights (not shown) in the smart-home environment. The smart wall switches may also control a power state or speed of a fan, such as a ceiling fan.

For example, sensors 72, 72 may detect the power and/or speed of a fan, and the controller 73 may adjusting the power and/or speed of the fan, accordingly. The smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, the smart-home environment may include one or more intelligent, multi-sensing, network-connected entry detectors (e.g., "smart entry detectors"). The sensors 71, 72 shown in FIG. 14 may be the smart entry detectors. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 14 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of the smart-home environment (e.g., as illustrated as sensors 71, 72 of FIG. 14 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment "learns" who is a user (e.g., an authorized user) and permits the electronic devices associated with those individuals to control the network-connected smart devices of the smart-home environment (e.g., devices communicatively coupled to the network 70). Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

The smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

Figure 15:
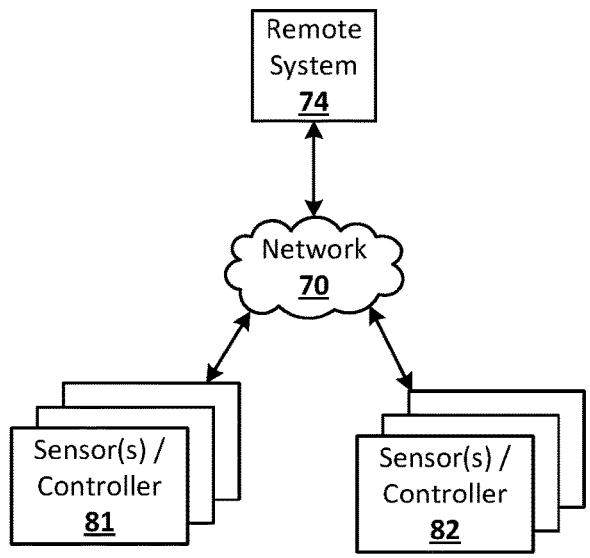
FIG. 15 shows a system according to an embodiment of the disclosed subject matter.

In some configurations, a remote system 74 may aggregate data from multiple locations, such as multiple buildings, multi-resident buildings, individual residences within a neighborhood, multiple neighborhoods, and the like. In general, multiple sensor/controller systems 81, 82 as previously described with respect to FIG. 14 may provide information to the remote system 74 as show in FIG. 15. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Figure 16:
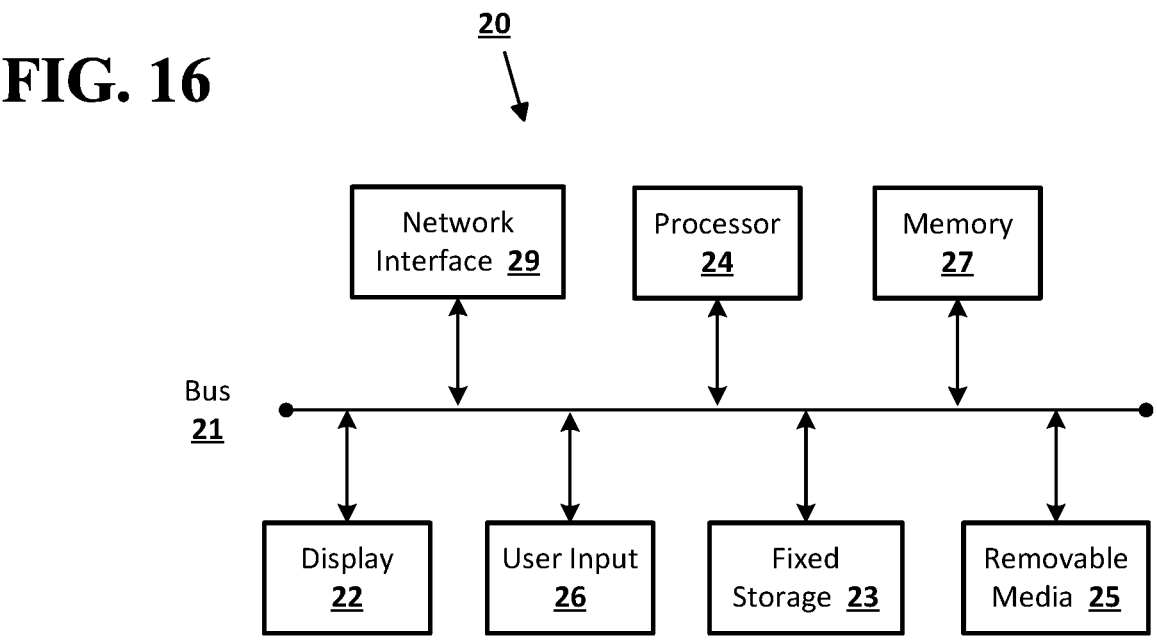
FIG. 16 shows a computer according to an embodiment of the disclosed subject matter.

Embodiments of the presently disclosed subject matter may be implemented in and used with a variety of computing devices. FIG. 16 is an example computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the device to communicate with other computers via one or more local, wide-area, or other communication networks, as described in further detail herein.

Figure 17:
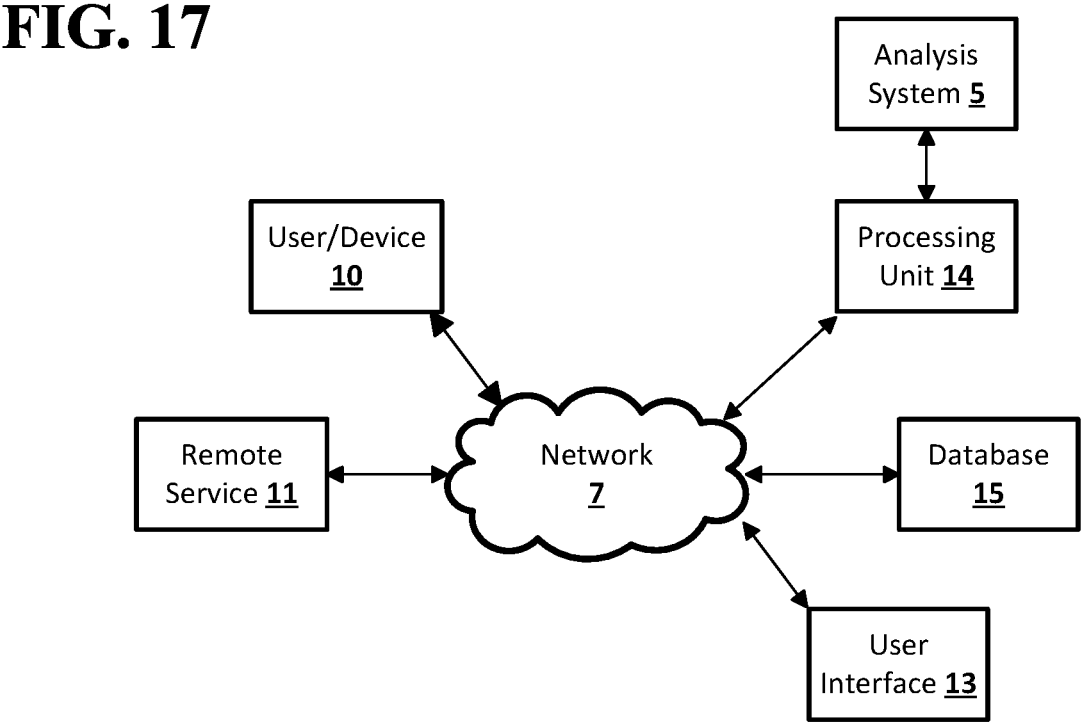
FIG. 17 shows a network configuration according to an embodiment of the disclosed subject matter.

FIG. 17 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
    receiving signals from one or more sensors distributed in an environment, the signals comprising reports from the one or more sensors;
    generating one or more occupancy state estimates for a ground-truth estimate sequence for the environment, each occupancy state estimate corresponding to an interval of a time period and based on the reports from the one or more sensors from before, during, and after the interval of the time period;
    generating an online occupancy model based at least partially on the ground-truth estimate sequence for the environment; and
    generating a current occupancy state estimate for the environment using the online occupancy model and one or more sensor states of the one or more sensors, wherein the one or more sensor states are based on the reports from the one or more sensors.

2. The computer-implemented method of claim 1, wherein the one or more occupancy state estimates for a ground-truth estimate sequence are generated based on heuristics.

3. The computer-implemented method of claim 1, wherein the one or more occupancy state estimates for a ground-truth estimate sequence are generated based on a lumped sensor, and wherein a lumped sensor comprises a combination of states of sensors of the same type over the time period.

4. The computer-implemented method of claim 1, wherein the online occupancy model comprises a transition model and a sensor model.

5. The computer-implemented method of claim 4, wherein the transition model comprises a transition probability matrix for possible occupancy states of the environment generated based on the one or more occupancy state estimates for the ground-truth estimate sequence.

6. The computer-implemented method of claim 4, wherein the sensor model comprises one or more lumped sensor probability distributions based on an event log comprising the reports from the one or more sensors and the one or more occupancy state estimates for the ground-truth estimate sequence.

7. The computer-implemented method of claim 6, wherein the one or more lumped sensor probability distributions comprises at least one of a lumped activity sensor probability distribution based on reports from one or more activity sensors and a lumped presence sensor probability distribution based on reports from one or more presence sensors.

8. The computer-implemented method of claim 4, wherein generating a current occupancy state estimate for the environment using the online occupancy model and one or more sensor states of the one or more sensors uses the transition model and the sensor model alternatively.

9. The computer-implemented method of claim 1, further comprising adjusting one or more of a security system and a thermostat of the environment based on the currency occupancy state estimate for the environment.

10. A computer-implemented system for online occupancy state estimation comprising:
    sensors distributed in an environment, each sensor adapted to monitor an aspect of the environment and generate a signal comprising a report from the sensor; and
    a hub computing device that receives signals from one or more sensors distributed in an environment, the signals comprising reports from the one or more sensors, generates one or more occupancy state estimates for a ground-truth estimate sequence for the environment, each occupancy state estimate corresponding to an interval of a time period and based on the reports from the one or more sensors from before, during, and after the interval of the time period, generates an online occupancy model based at least partially on the ground-truth estimate sequence for the environment, and generates a current occupancy state estimate for the environment using the online occupancy model and one or more sensor states of the one or more sensors, wherein the one or more sensor states are based on the reports from the one or more sensors.

11. The computer-implemented system of claim 10, wherein the one or more occupancy state estimates for a ground-truth estimate sequence are generated based on heuristics.

12. The computer-implemented system of claim 10, wherein the one or more occupancy state estimates for a ground-truth estimate sequence are generated based on a lumped sensor, and wherein a lumped sensor comprises a combination of states of sensors of the same type over the time period.

13. The computer-implemented method of claim 10, wherein the online occupancy model comprises a transition model and a sensor model.

14. The computer-implemented method of claim 13, wherein the transition model comprises a transition probability matrix for possible occupancy states of the environment generated based on the one or more occupancy state estimates for the ground-truth estimate sequence.

15. The computer-implemented method of claim 13, wherein the sensor model comprises one or more lumped sensor probability distributions based on an event log comprising the reports from the one or more sensors and the one or more occupancy state estimates for the ground-truth estimate sequence.

16. The computer-implemented method of claim 15, wherein the one or more lumped sensor probability distributions comprises at least one of a lumped activity sensor probability distribution based on reports from one or more activity sensors and a lumped presence sensor probability distribution based on reports from one or more presence sensors.

17. The computer-implemented method of claim 13, wherein generating a current occupancy state estimate for the environment using the online occupancy model and one or more sensor states of the one or more sensors uses the transition model and the sensor model alternatively.

18. The computer-implemented method of claim 10, further comprising adjusting one or more of a security system and a thermostat of the environment based on the currency occupancy state estimate for the environment.

19. A system comprising: one or more computers and one or more storage devices storing instructions which are operable, when executed by the one or more computers, to cause the one or more computers to perform operations comprising:
   receiving signals from one or more sensors distributed in an environment, the signals comprising reports from the one or more sensors;
   generating one or more occupancy state estimates for a ground-truth estimate sequence for the environment, each occupancy state estimate corresponding to an interval of a time period and based on the reports from the one or more sensors from before, during, and after the interval of the time period;
   generating an online occupancy model based at least partially on the ground-truth estimate sequence for the environment; and
   generating a current occupancy state estimate for the environment using the online occupancy model and one or more sensor states of the one or more sensors, wherein the one or more sensor states are based on the reports from the one or more sensors.

20. The system of claim 19, wherein the instructions further cause the one or more computers to perform operations comprising adjusting one or more of a security system and a thermostat of the environment based on the currency occupancy state estimate for the environment.

* * * * *